(12) United States Patent  
Wong

(10) Patent No.: US 9,107,072 B2  
(45) Date of Patent: Aug. 11, 2015

(54) SEAMLESS MOBILE SUBSCRIBER IDENTIFICATION

(76) Inventor: Alexander Hoi Wong, Markham (CA)

( * ) Notice: Subject to any disclaimer, the term of this patent is extended or adjusted under 35 U.S.C. 154(b) by 0 days.

(21) Appl. No.: 13/578,775

(22) PCT Filed: Feb. 11, 2011

(86) PCT No.: PCT/CA2011/000155  
§ 371 (c)(1),  
(2), (4) Date: Sep. 19, 2012

(87) PCT Pub. No.: WO2011/097706  
PCT Pub. Date: Aug. 18, 2011

(65) Prior Publication Data  
US 2013/0150000 A1    Jun. 13, 2013

Related U.S. Application Data

(60) Provisional application No. 61/304,034, filed on Feb. 12, 2010.

(51) Int. Cl.  
*H04M 1/66* (2006.01)  
*H04W 4/00* (2009.01)  
*H04W 12/06* (2009.01)  
*H04L 29/06* (2006.01)

(52) U.S. Cl.  
CPC .......... *H04W 12/06* (2013.01); *H04L 63/0807* (2013.01)

(58) Field of Classification Search  
CPC ........ H04W 12/06; H04W 12/08; H04L 9/32; H04L 9/00; H04L 63/0807; H04L 63/0815; H04L 63/0892

USPC .............. 455/411, 433, 432.1; 726/9, 12, 3, 4  
See application file for complete search history.

(56) References Cited

U.S. PATENT DOCUMENTS

| | | | |
|---|---|---|---|
| 5,805,803 A * | 9/1998 | Birrell et al. ..................... 726/12 |
| 7,221,935 B2 * | 5/2007 | Barriga-Caceres et al. .......................... 455/414.1 |
| 7,356,694 B2 * | 4/2008 | Mayo et al. ................... 713/159 |

(Continued)

FOREIGN PATENT DOCUMENTS

WO    2007/071009 A1    6/2007

OTHER PUBLICATIONS

International Search Report mailed on May 26, 2011 in connection with International Patent Application Serial No. PCT/CA2011/000155, 3 pages.

(Continued)

*Primary Examiner* — William Nealon

(57) ABSTRACT

A method for execution by at least one server within a domain of a service provider. The method comprises receiving a first request from a communication device registered with the service provider. A response including a token is sent to the communication device. Then a second request is received, this one from an application server over a communication channel at least partly not within the domain of the service provider. The second request contains the token, which causes the at least one server to send a response to the application server, which response includes information about the communication device obtained based on the token. Use of the token facilitates customer access to data services and applications, while making the token anonymous safeguards the privacy of customer data.

20 Claims, 17 Drawing Sheets

(56) References Cited

U.S. PATENT DOCUMENTS

| | | | |
|---|---|---|---|
| 2005/0086535 A1* | 4/2005 | Ernst et al. | 713/201 |
| 2005/0096048 A1 | 5/2005 | Clare et al. | |
| 2005/0204148 A1* | 9/2005 | Mayo et al. | 713/185 |
| 2006/0235761 A1* | 10/2006 | Johnson | 705/26 |
| 2008/0127320 A1* | 5/2008 | De Lutiis et al. | 726/9 |
| 2008/0293379 A1* | 11/2008 | Hinton et al. | 455/411 |
| 2009/0037982 A1* | 2/2009 | Wentker et al. | 726/3 |
| 2009/0217048 A1* | 8/2009 | Smith | 713/176 |

OTHER PUBLICATIONS

Written Opinion of the International Searching Authority mailed on May 26, 2011 in connection with International Patent Application Serial No. PCT/CA2011/000155, 6 pages.

Kerberos Overview—An Authentication Service for Open Network Systems. White Paper. Cisco System, Inc. 2009-2010 [retrieved on Apr. 26, 2011]. Received from the Internet: http://www.cisco.com/en/US/tech/tk59/technologies_white_paper09186a00800941b2.shtml, 15 pages.

* cited by examiner

SEAMLESS MOBILE SUBSCRIBER IDENTIFICATION

CROSS-REFERENCE TO RELATED APPLICATION

The present application claims the benefit under 35 USC §119(e) of U.S. Provisional Patent Application Ser. No. 61/304,034, filed Feb. 12, 2010, hereby incorporated by reference herein.

FIELD

The present invention relates to mobile communications and, more particularly, to methods and systems for identifying customers in order to facilitate customer access to data applications and services.

BACKGROUND

Users increasingly employ mobile devices to access data applications and services, particularly over the Internet. With this comes the need to register and maintain accounts with various web sites and other providers of internet applications and services. In order to maintain a certain level of security and privacy, users are requested to input their credentials each time they wish to access these applications and services. However, this process can be cumbersome, especially as the number of available applications and services increases. Thus, there is a need in the industry to provide a mechanism that facilitates user access to data applications and services while maintaining an expected level of security and privacy.

SUMMARY OF THE INVENTION

According to a first broad aspect, certain embodiments of the present invention seek to provide A method for execution by an application server capable of being accessed by a communication device that is registered with a service provider having a certain domain, the method comprising: receiving a token from the communication device over a communication channel at least partly not within the domain of the service provider, the token having been previously released to the communication device by a first server within the domain of the service provider; providing the token to a second server within the domain of the service provider; and executing an application based on information about the communication device released by the second server in response to the token.

According to a second broad aspect, certain embodiments of the present invention seek to provide An application server capable of being accessed by a communication device that is registered with a service provider having a certain domain, the application server comprising: an input for receiving a token from the communication device over a communication channel at least partly not within the domain of the service provider, the token having been previously released to the communication device by a first server within the domain of the service provider; an output for providing the token to a second server within the domain of the service provider; and a processing entity for executing an application based on information about the communication device released by the second server in response to the token.

According to a third broad aspect, certain embodiments of the present invention seek to provide A non-transitory computer-readable storage medium storing computer-readable instructions which, when executed by an application server capable of being accessed by a communication device that is registered with a service provider having a certain domain, cause the application server to execute a method that comprises: receiving a token from the communication device over a communication channel at least partly not within the domain of the service provider, the token having been previously released to the communication device by a first server within the domain of the service provider; providing the token to a second server within the domain of the service provider; and executing an application based on information about the communication device released by the second server in response to the token.

According to a fourth broad aspect, certain embodiments of the present invention seek to provide A method for execution by a communication device that is registered with a service provider having a certain domain, the method comprising: receiving a token from a first server within the domain of the service provider; and sending the token to an application server over a communication channel at least partly not within the domain of the service provider; wherein the application server executes an application\device based on information about the communication device released by a second server within the domain of the service provider in response to receipt of the token from the server.

According to a fifth broad aspect, certain embodiments of the present invention seek to provide According to a first broad aspect, certain embodiments of the present invention seek to provide A method for execution by a communication device that is registered with a service provider having a certain domain, the method comprising: receiving a request for a directory number of the communication device from a server within the domain of the service provider; sending the directory number of the communication device to the server; receiving a token from the server in response to said sending; sending the token to an application server over a communication channel at least partly not within the domain of the service provider, wherein validation of the token enables provision of a data service by the application server.

According to a sixth broad aspect, certain embodiments of the present invention seek to provide A communication device that is registered with a service provider having a certain domain, the communication device comprising: an input/output interface; a processing entity for causing a directory number of the communication device to be sent via the input/output interface in response to a request received via the input/output interface from a server within the domain of the service provider, the processing entity further for causing a token to be sent via the input/output interface to an application server over a communication channel at least partly not within the domain of the service provider in response to receipt of the token via the input/output interface from said server within the domain of the service provider, wherein validation of the token enables provision of a data service by the application server.

According to a seventh broad aspect, certain embodiments of the present invention seek to provide A non-transitory computer-readable storage medium storing computer-readable instructions which, when executed by a communication device that is registered with a service provider having a certain domain, cause the communication device to execute a method that comprises: receiving a request for a directory number of the communication device from a server within the domain of the service provider; sending the directory number of the communication device to the server; receiving a token from the server in response to said sending; sending the token to an application server over a communication channel at least partly not within the domain of the service provider;

wherein validation of the token enables provision of a data service by the application server.

According to an eighth broad aspect, certain embodiments of the present invention seek to provide A method for execution by at least one server within a domain of a service provider, the method comprising: receiving a first request from a communication device registered with the service provider; sending to the communication device a first response including a token; receiving a second request from an application server over a communication channel at least partly not within the domain of the service provider, the second request containing the token; and sending to the application server a second response including information about the communication device obtained based on the token.

According to a ninth broad aspect, certain embodiments of the present invention seek to provide A plurality of servers in a domain of a service provider, wherein at least one of the servers is configured for receiving a first request from a communication device registered with the service provider; wherein at least one of the servers is configured for sending to the communication device a first response including a token; wherein at least one of the servers is configured for receiving a second request from an application server over a communication channel at least partly not within the domain of the service provider, the second request containing the token; and wherein at least one of the servers is configured for sending to the application server a second response including information about the communication device obtained based on the token.

According to a tenth broad aspect, certain embodiments of the present invention seek to provide A non-transitory computer-readable storage medium storing computer-readable instructions which, when executed by at least one server within a domain of a service provider, cause the processing entity to execute a method that comprises: receiving a first request from a communication device registered with the service provider; sending to the communication device a first response including a token; receiving a second request from an application server over a communication channel at least partly not within the domain of the service provider, the second request containing the token; and sending to the application server a second response including information about the communication device obtained based on the token.

These and other aspects and features of the present invention will now become apparent to those of ordinary skill in the art upon review of the following description of specific embodiments of the invention in conjunction with the accompanying drawings.

It is to be expressly understood that the description and drawings are only for the purpose of illustration of certain embodiments of the invention and are an aid for understanding. They are not intended to be a definition of the limits of the invention.

DETAILED DESCRIPTION

First Embodiment

Figure 1:
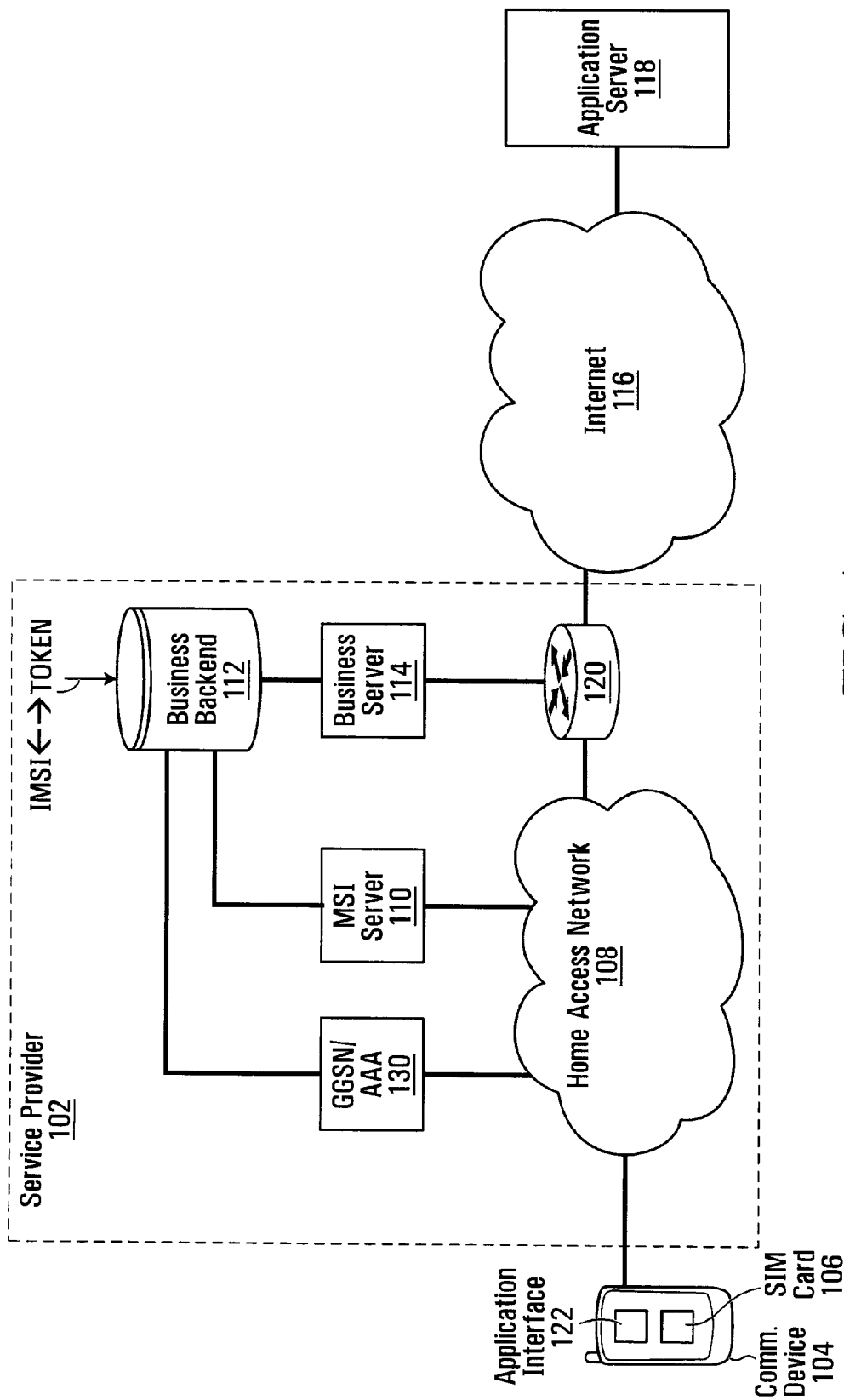
FIG. 1 is a block diagram of a network architecture in accordance with a non-limiting embodiment.

FIG. 1 shows an architecture that can be used in a non-limiting embodiment of the present invention. Specifically, there is shown a communication device 104 which, in a non-limiting embodiment, can be a mobile phone with data capabilities (e.g., various models made by companies such as Apple (e.g., iPhone™, iPad™) Research in Motion (e.g., BlackBerry™), Hewlett-Packard (e.g., Palm™), HTC, etc.). Communication device 104 includes an input/output interface and can implement an operating system such as Blackberry OS™, Google Android™ or Symbian™, to name a few non-limiting possibilities.

Communication device 104 includes an identification device 106 that stores a unique device identifier. In a non-limiting embodiment, the identification device 106 can be of a type that is inserted into communication device 104. A non-limiting example of the identification device 106 is a Subscriber Identity Module (SIM) card. A non-limiting example of a device identifier that can be stored by the identification device 106 includes an IMSI (International Mobile Subscriber Identity). Another non-limiting example of the identification device 106 is a biometric device and the corresponding device identifier that can be stored thereon may include a fingerprint, iris scan or other biometric information obtained during an enrollment session with a user of communication device 104. Still other possibilities exist without departing from the scope of the invention. For simplicity, the remainder of the description refers to the IMSI as an exemplary device identifier but in view of the previous comments, this simplification should not be construed in a limiting way.

Communication device 104 is registered with a service provider 102. Specifically, a service relationship is formed between the service provider 102 and a customer, i.e., an entity responsible for communication device 104. As part of this service relationship, a customer account is maintained for the customer, and the customer agrees to pay for the privilege of receiving communication services using communication device 104.

The communication services are delivered to communication device 104 over an access network 108, which is owned and/or controlled by the service provider 102. As mentioned above, the service provider 102 maintains a customer account associated with communication device 104. Thus, the access network 108 can be viewed as a "home" access network from the perspective of the customer and/or communication device 104. In the following description, therefore, the access network 108 will be referred to as the home access network 108.

One of the services provided by the service provider 102 may be to allow communication device 104 to access a public data network (such as the internet 116) under certain conditions. Internet access is provided from the home access network 108 via a router/gateway 120, which can also route traffic from the internet 116 to the home access network 108 as well as to various other resources and components under the ownership/control of the service provider 102 (collectively referred to as the "domain" of the service provider 102). By gaining access to the internet 116, communication device 104 can access a wealth of web sites and servers. It will be noted that the Internet 116 is not within the domain of the service provider 102.

By way of example, using a client-side application 122 (sometimes referred to as an application interface) residing on communication device 104, communication device 104 can access an application server 118 that is suitably configured to execute one or more server-side applications. In a non-limiting embodiment, the application server 118 can be implemented by a web server and therefore can include a computing apparatus with a connection to the internet 116 and a routable IP address. In particular, communications intended for the application server 118 can be addressed to a specific URL that is translated into the IP address of the application server 118 by a domain name server (DNS) in the internet 116. The application server 118 includes or has access to a memory 118M that stores computer-readable instructions, which are executed by a processing unit 118P forming part of the application server 118. Subsets of these instructions can encode individual server-side applications. Examples of a server-side application may include a streaming television service, a self-serve profile management service and a location-based service (i.e., an application that utilizes the current location of communication device 104), to name just a few non-limiting possibilities.

In a non-limiting embodiment, the client-side application 122 can be pre-installed on communication device 104 and therefore may already be encoded in memory when communication device 104 is first shipped to the customer (i.e., a "pre-activation" scenario). In another non-limiting embodiment, the client-side application 122 can be obtained (downloaded) from the service provider 102 (or from the application server 118 or from an application repository such as itunes Store™) only after communication device 104 establishes a connection to the service provider 102 via the home access network 108 (i.e., a "post-activation" scenario). In a non-limiting embodiment, the client-side application 122 can implement an internet browser, such as MS-Explorer, Firefox, etc. In another non-limiting embodiment, the client-side application 122 can be a customized application that is specifically designed to interact with server-side applications installed on the application server 118.

Continuing with the description of FIG. 1, the service provider 102 maintains a business backend 112 also forming part of the domain of the service provider 102. In particular, the business backend 112 may comprise a variety of databases, servers (e.g., a lightweight directory access protocol—LDAP—server) and other equipment for maintaining a directory number (DN) assigned to communication device 104 as well as data in association with the customer account. A non-limiting example of a directory number is a Mobile Station International Subscriber Directory Number (MSISDN). Other data maintained in association with the customer account can include, without limitation, one or more of: billing address, credit card number, language preference, current geographic location (lat/long), service subscription parameters (e.g., does the customer account indicate a subscription to a live television service, etc.) and a unique device identifier (such as the aforementioned IMSI associated with the identification device 106).

In a non-limiting embodiment, the business backend 112 additionally maintains a token in association with communication device 104. In particular, the token can be a unique information element that maps to the device identifier (e.g., IMSI) of communication device 104. In an embodiment, the token is selected such that it lacks information that would allow information regarding the customer to be ascertained by an entity not within the domain of the service provider. This can be achieved by selecting a token that consists of a service-provider-specific subscriber identifier or a random number, to name a few non-limiting possibilities. With the design of such a token in place, interception of the token (e.g., by a hacker on the internet 116) would not constitute a damaging breach of customer privacy.

In a non-limiting embodiment, and as will be described further below, the token can be assigned to communication device 104 by a mobile station identifier (MSI) server 110 (also forming part of the domain of the service provider). The MSI server 110, sometimes referred to as a network subscriber identification (NSI) server, can have an internal communication link to the home access network 108 through which it may send the token to communication device 104 for future use by communication device 104 when communicating with the application server 118 (this is described further below). The MSI server 110 can also have an internal communication link to the business backend 112 so that the business backend 112 may be informed of the association between the token and the device identifier of communication device 104. Those skilled in the art will appreciate that the absence of an HTTP proxy in the architecture of FIG. 1 removes a significant source of congestion for handling requests from communication device 104 that are destined for the MSI server 110.

The business backend 112 also has an internal communication link to a business server 114, which is also under the ownership/control of the service provider 102 and therefore is also within the domain of the service provider 102. The business server 114 can have a presence on the internet 116 by virtue of a routable IP address. In particular, in order to access the business server 114, entities on the internet 116 can address their communications to a specific URL that is translated into the IP address of the business server 114 by a domain name server (DNS) in the internet 116. It will be appreciated that the business server 114 can serve as an interface to allow servers on the internet 116 (such as the application server 118) to send queries to and receive responses from the service provider 102.

It should also be appreciated that the architecture of FIG. 1 may include other components that have not been illustrated or described in order not to obscure the description of embodiments of the present invention. Generally, such components may include a variety of base stations, mobile switching centers, routers, firewalls, proxy servers and so on. It is expected that those skilled in the art will know to use such components when required or desired for a practical implementation.

Scenario A: Customized Client-side Application 122

Figure 2A:
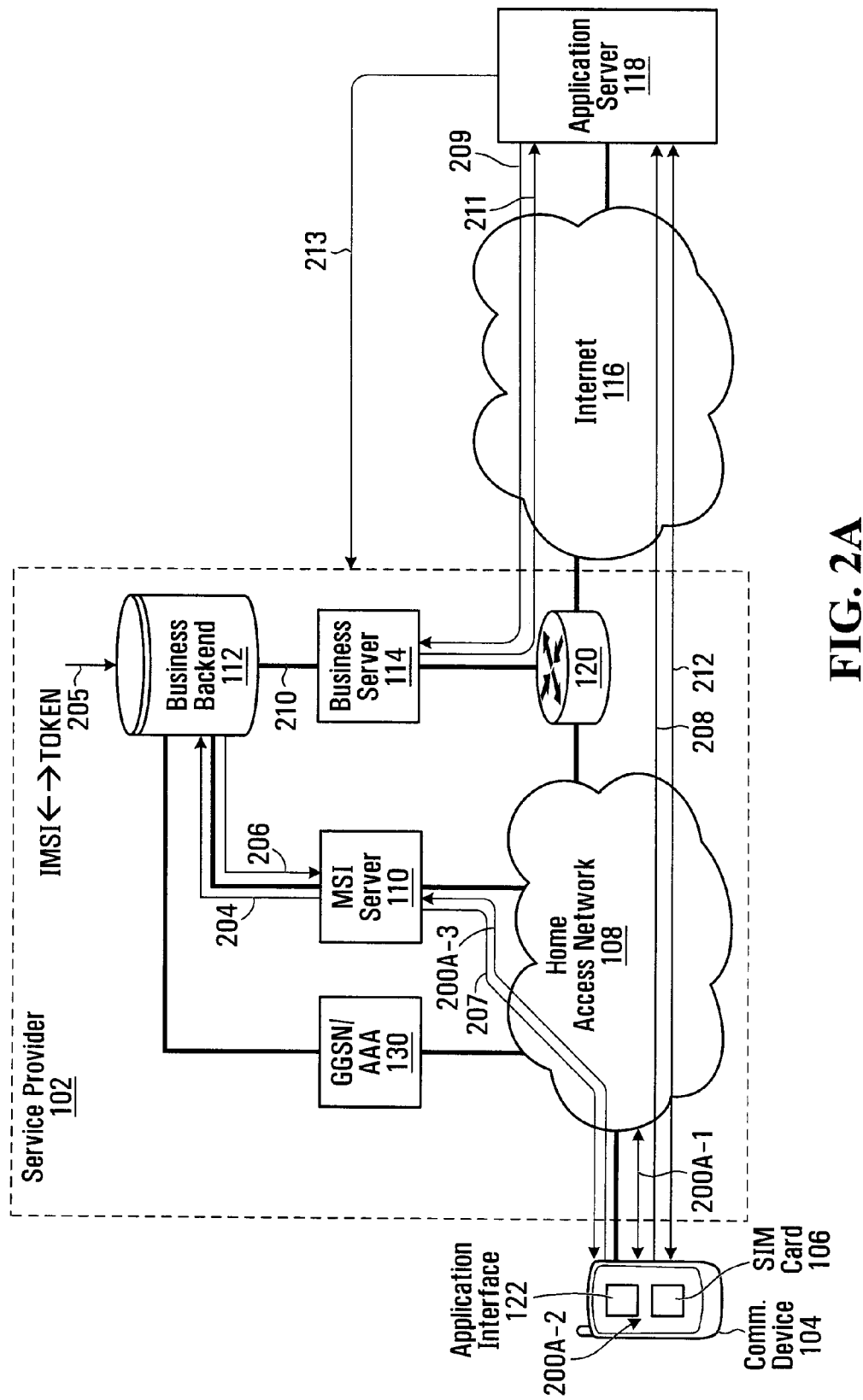
FIGS. 2A and 2B are flow diagrams amongst elements of the network architecture of FIG. 1, in accordance with non-limiting embodiments.
Figure 11:
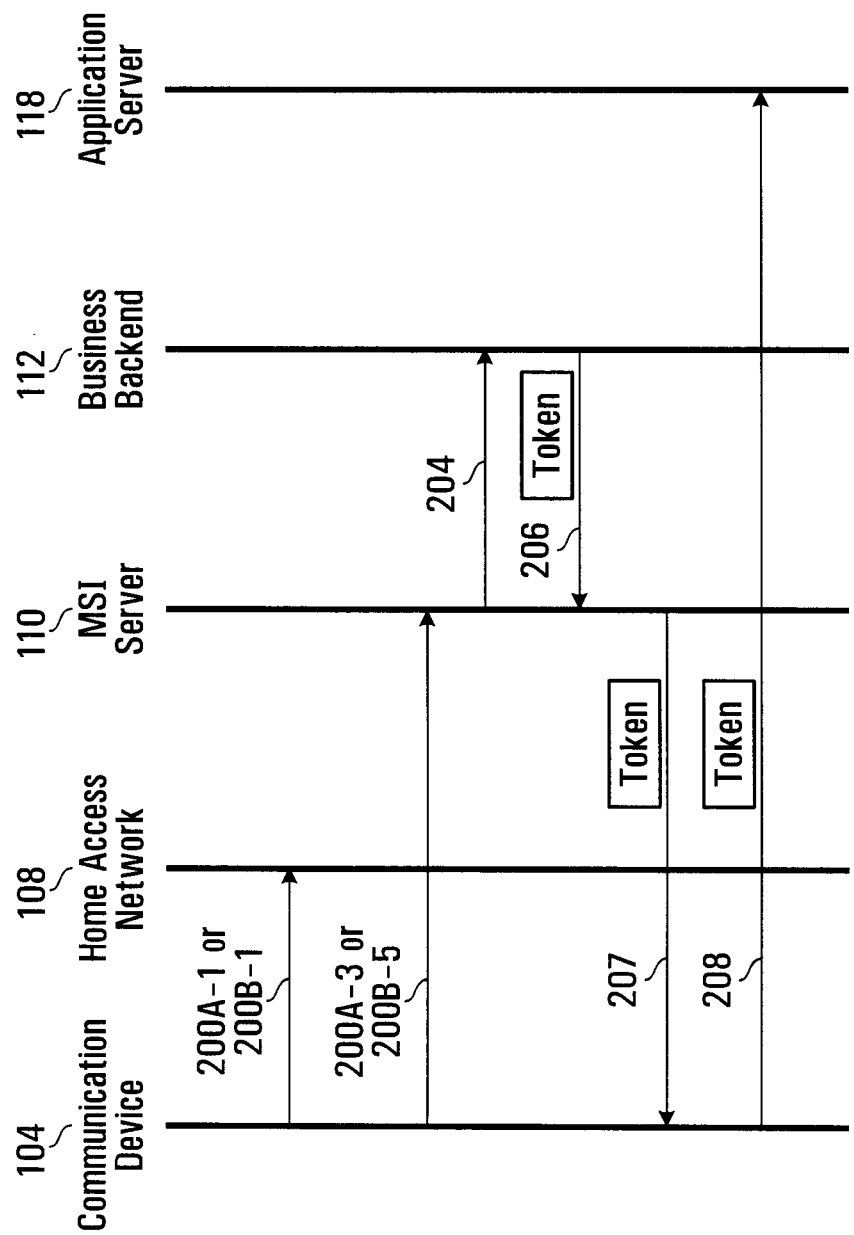
FIG. 11 is a flow diagram illustrating an example message flow that complements FIGS. 2A and 2B.

Consider now FIG. 2A which, together with FIG. 11, illustrates a message flow amongst the components illustrated in FIG. 1 that is applicable to a scenario where the client-side application 122 is specifically associated with a particular server-side application (e.g., it is downloaded from an application repository such as itunes Store™).

In phase 200A-1, communication device 104 establishes a data connection with the home access network 108. During this process, and in a standard fashion, an entity (not shown) in the home access network 108 sends an identifier (e.g., a logical identifier such as an IP address) to communication device 104 based on its directory number (e.g., its MSISDN). The IP address is a logical identifier that the service provider 102 has uniquely assigned to the MSISDN of communication device 104. The IP address may be statically assigned or it may be dynamically assigned and then maintained. The association between the IP address and the MSISDN may be stored in the business backend 112 or in a server such as a Gateway GPRS Support Node (GGSN) or an Authentication, Authorization and Accounting (AAA) server 130.

In phase 200A-2, which can take place before, during or after phase 200A-1, communication device 104 extracts the device identifier (e.g., the IMSI) from the identification device 106 (e.g., the SIM card). This can be done using a lower layer protocol and/or operating system, as will be appreciated by those of skill in the art.

In phase 200A-3, which can take place before, during or after phase 200A-1, a user of communication device 104 activates the client-side application 122. This results in the transmission of a request to the MSI server 110, wherein the request contains the IMSI extracted in phase 200A-2. Specifically, the user can click on or otherwise select an icon displayed on communication device 104. An address of the MSI server 110 may be pre-programmed into the client-side application 122. Accordingly, upon having been activated, the client-side application 122 can be configured to automatically issue a request directed to the address of the MSI server 110. The address of the MSI server 110 can be an IP address, or it can be a URL, which is translated into an IP address by a domain name server (DNS) within the home access network 108.

Scenario B: Generic Client-side Application 122

Figure 2B:
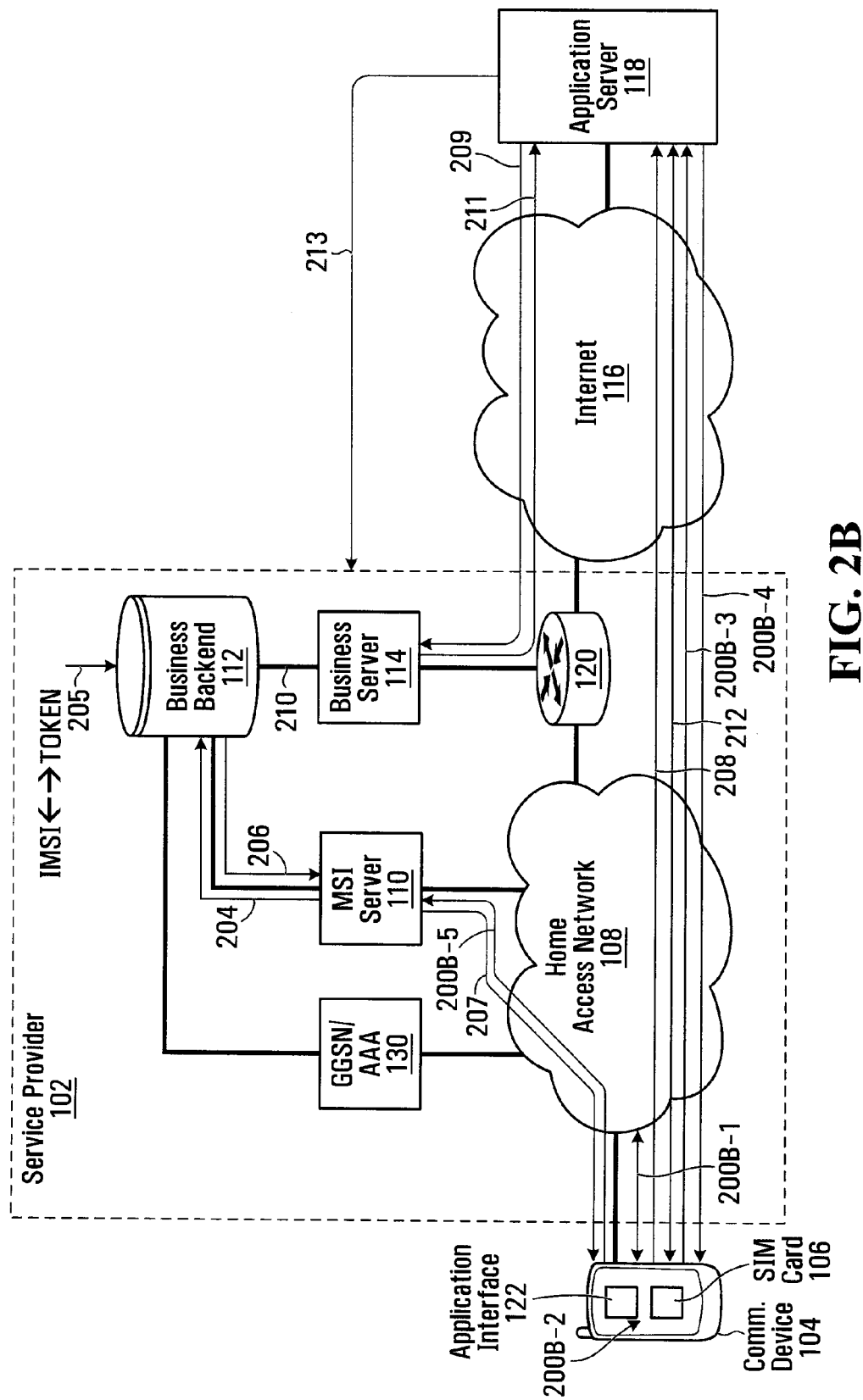

Consider now FIG. 2B which, together with FIG. 11, illustrates a message flow amongst the components illustrated in FIG. 1 that is applicable to a scenario where the client-side application 122 is generic (e.g., a web browser).

In phase 200B-1, communication device 104 establishes a data connection with the home access network 108. During this process, and in a standard fashion, an entity (not shown) in the home access network 108 sends an identifier (e.g., a logical identifier such as an IP address) to communication device 104 based on its directory number (e.g., its MSISDN). The IP address is a logical identifier that the service provider 102 has uniquely assigned to the MSISDN of communication device 104. The IP address may be statically assigned or it may be dynamically assigned and then maintained. The association between the IP address and the MSISDN may be stored in the business backend 112 or in a server such as a Gateway GPRS Support Node (GGSN) or an Authentication, Authorization and Accounting (AAA) server 130.

In phase 200B-2, which can take place before, during or after phase 200B-1, communication device 104 extracts the device identifier (e.g., the IMSI) from the identification device 106 (e.g., the SIM card). This can be done using a lower layer protocol and/or operating system, as will be appreciated by those of skill in the art.

In phase 200B-3, upon gaining access to the home access network 108, communication device 104 establishes a data connection with the application server 118 over the internet 116. This can be done using the client-side application 122 implemented as a web browser. During the data connection with the application server 118, the user of communication device 104 requests execution of the particular server-side application on the application server 118. For example, this may be achieved by the user selecting a URL on a web page being displayed by the application server 118 via the client-side application 122. For illustrative purposes, a non-limiting example URL of the particular server-side application could be http://AppID.appserver.com.

In phase 200B-4, the application server 118 detects the request for execution of the particular server-side application. Based on the contents and/or form of the request, the application server 118 recognizes that communication device 104 is associated with the service provider 102 and that a token is required before it can proceed further. The application server 118 thus automatically redirects the client-side application 122 (e.g., the web browser) on communication device 104 to a predetermined address associated with the service provider 102 for the purpose of obtaining the token. The predetermined address may be the address of the MSI server 110.

In phase 200B-5, communication device 104 directs its request for a token to the MSI server 110. The request contains the IMSI extracted in phase 200B-2.

In both scenarios A and B, and referring now to both FIGS. 2A and 2B simultaneously, it will be observed that communication device 104 sends the request to the MSI server 110 over a path entirely within the domain of the service provider 102. As such, the request reaches the MSI server 110 over a channel that can be kept secure, and which only traverses network equipment that is within the domain of the service provider 102. Also, it should be appreciated that the information in the request (e.g., the IMSI) may be encrypted using a shared secret between communication device 104 and the MSI server 110.

A non-limiting example of the request sent to the MSI server 110 would be "RESTful", i.e., in conformance with REST (representational state transfer) constraints. REST is not in itself a standard, but a RESTful implementation such as the World Wide Web can use standards such as HTTP, URL, XML, PNG, etc. The following illustrates a possible formulation of the request to the MSI server 110:

| | |
|---|---|
| URL | http://msi.operator.com/token;appId=[AppID]&enc[IMSI] |
| Method | GET |
| Returns | 200 OK & XML |
| | 401 Unauthorized |
| | 404 Not Found |
| | 500 Service Unavailable |
| | 504 Gateway Timeout, | where AppID identifies the particular server-side application to be executed and enc[IMSI] is an encrypted form of the IMSI. It should be appreciated that the above example is used merely for illustrative purposes and in no way limits the scope of the invention. For example, the request can be formulated in accordance with SOAP- or Web Services Description Language (WSDL)-based principles.

In phase 204, the MSI server 110 receives the request, containing the potentially encrypted IMSI, from communication device 104. The MSI server 110 determines the IMSI (potentially through decryption, using knowledge of the shared secret) and sends a query to the business backend 112 on the basis of the IMSI.

In phase 205, the business backend 112 receives the query from the MSI server 110 and attempts to find the token uniquely corresponding to the IMSI supplied by the MSI server 110. To this end, the business backend 112 consults one or more databases.

In phase 206, assuming the sought after token can be found in its databases, the business backend 112 returns the token to the MSI server 110.

In phase 207, the MSI server 110 releases the token to communication device 104 over the path previously established within the home access network 108. To the end, the token can be included in an XML response. The MSI server 110 may also release other profile information it has obtained from the business backend 112, such as language preference, account type (prepaid or postpaid), etc. The following illustrates a possible formulation of an XML response to the original request sent to the MSI server 110:

```
<?xml version="1.0"?>
<subscriber>
    <token>000179700x0006E274C175037344_operator.com</token>
    <Language>E</Language>
</subscriber>
```

It should be appreciated that the above example is used merely for illustrative purposes and in no way limits the scope of the invention. Notwithstanding the foregoing, a general property of the token is that it appears virtually meaningless to someone who intercepts it and does not know the mapping in the business backend 112 that associates the token to a customer.

In phase 208, communication device 104 now issues a request directed to the application server 118, containing the token received from the MSI server 110. In a non-limiting embodiment, the client-side application 122 can cooperate with the operating system of communication device 104 in order to detect when the token has been received from the service provider 102, thereby triggering the request directed to the application server 118.

In scenario A, whereby the client-side application 122 is specifically associated with the particular server-side application, an address of the particular server-side application may be pre-programmed into the client-side application 122. For illustrative purposes, a non-limiting example address of the particular server-side application could be http://AppID.appserver.com. Accordingly, the client-side application 122 can be configured such that, upon receiving the token from the MSI server 110, it will automatically issue a request directed to the address of the server-side application (residing on the application server 118). For illustrative purposes, the request could be issued to the URL http://AppID.appserver.com/token.

In scenario B, whereby the client-side application 122 is generic (e.g., a web browser), the client-side application 122 can be redirected to the URL associated with the particular server-side application that was originally entered by the user in phase 200B-3, while also supplying the token. For illustrative purposes, an example of the URL to which the web server could be directed is http://AppID.appserver.com/token.

The request, including the token, thus travels via the router/gateway 120 and over the internet 116 towards the application server 118. It is noted that the token is meaningless to an eavesdropper, because it is anonymous, i.e., it does not contain information that would allow information regarding the customer to be ascertained by someone outside the domain of the service provider 102.

In phase 209, the application server 118, upon receipt of the request containing the token, initiates an inquiry with the business server 114. This can be referred to as validating the token. Specifically, the application server 118 supplies the token to the business server 114 over a link. The link can be established over the internet 116 and can employ virtual private network (VPN) technology. Alternatively, establishment of the link can involve accessing a web-based portal of the service provider 102. (In either case, it is assumed that the application server 118—or an entity that controls it—has an agreement with the service provider 102 whereby such inquiries are permitted. While the application server 118 may be within the domain of the service provider 102, this is not required. Thus, the entity that controls the application server 118 may be independent of the service provider 102.) The identity of the service provider 102 and/or the address of the business server 114 can be explicitly or implicitly specified in the content and/or format of the request received from communication device 104. Thus, for example, the request may identify a URL where the business server 114 may be reached.

In phase 210, the business server 114 receives the token and consults one or more databases in the business backend 112 in order to identify the associated IMSI, which in this case is the IMSI of the identification device 106 inserted into communication device 104. Based on the IMSI, the business server 114 obtains information about communication device 104. The business server 114 then formulates a response which is sent to the application server 118.

The type of information about communication device 104 obtained by the business server 114 depends on the nature of the particular server-side application that is to be executed by the application server 118.

In one non-limiting example, the particular server-side application may provide a streaming television service. In such a case, the application server 118—or an entity that controls it—may want to ensure that it will be paid for delivering the streaming television service to communication device 104. Accordingly, the information about communication device 104 obtained by the business server 114 can include an indication of whether the customer is authorized to receive the streaming television service (e.g., whether the customer is subscribed to the streaming television service). If the answer is "yes", the response formulated by the business server 114 and sent to the application server 118 can be an authorization confirmation, whereas if the answer is "no", the response formulated by the business server 114 and sent to the application server 118 can be an authorization denial.

In another non-limiting example, the particular server-side application may provide a self-serve profile management service. In such a case, the information about communication device 104 obtained by the business server 114 can include various customer profile information that the user may choose to modify through further additional interaction with the business server 114.

In yet another non-limiting example, the particular server-side application may provide a location-based service, namely a service that utilizes information about the current location of the communication device. In such a case, the information about communication device 104 obtained by the business server 114 can include an indication of the current geographic location (e.g., GPS coordinates) of communication device 104. The response formulated by the business server 114 and sent to the application server 118 can include the current geographic location of communication device 104. It should be appreciated that in some embodiments, the current geographic location of communication device 104 may not be stored in the business backend 112. Rather, such information may need to be obtained from another entity, possibly even from communication device 104 itself. Therefore, it is within the scope of the invention for the business server 114 to initiate a query to communication device 104

(via control plane signaling or data plane signaling) in order to obtain the current geographic location of communication device 104 directly from communication device 104, in an on-demand fashion.

Other information associated with communication device 104 that may similarly be formulated into a response by the business server 114 can include address information, financial information, demographic information, digital credentials (such as usernames and passwords for accessing a variety of websites), to name a few non-limiting possibilities. This information may be obtained from one or more databases in the business backend 112.

In phase 211, the response formulated by the business server 114 is released to the application server 118, e.g., over the internet 116. If necessary, the response may be sent over an encrypted channel established between the business server 114 and the application server 118.

In phase 212, and depending on the response to its inquiry as received from the service provider 102 in phase 211, the application server 118 may proceed to execute the particular server-side application. The particular server-side application can provide a television streaming service, a self-serve profile management service, a location-based service (e.g., identification of nearby restaurants, etc.) or any number of a wide variety of other possible services. During execution of the particular server-side application, the application server 118 can record/log parameters such as usage, queries made, and so on.

In phase 213, termination of the particular server-side application occurs. This can happen either under control of the application server 118 or of the user of communication device 104. Account settlement and reconciliation may then take place.

As mentioned previously, it should be appreciated that the entity that controls the application server 118 can be independent of the service provider 102. As such, there may be an exchange of consideration related to execution of the particular server-side application by the application server 118 and/or provision of the information about communication device 104 by the service provider 102. For example, the application server 118 can be contracted by the service provider 102 to execute the particular server-side application for its customers. Under this arrangement, the entity responsible for the application server 118 can charge the service provider 102 a fee for having executed the particular server-side application, whereas the service provider 102 can, in turn, settle with the customer, such as through an invoicing mechanism. In such an example, fees incurred as a result of having used the particular server-side application could be added to the amount charged (by the service provider 102) to the customer for the current billing cycle. Under another possible arrangement, the service provider 102 can charge the application server 118 a fee for having provided it with the information about communication device 104, and this fee can be recouped by the application server 118 by invoicing the customer directly for use of the particular server-side application (or through pre-payment).

Second Embodiment

Figure 3:
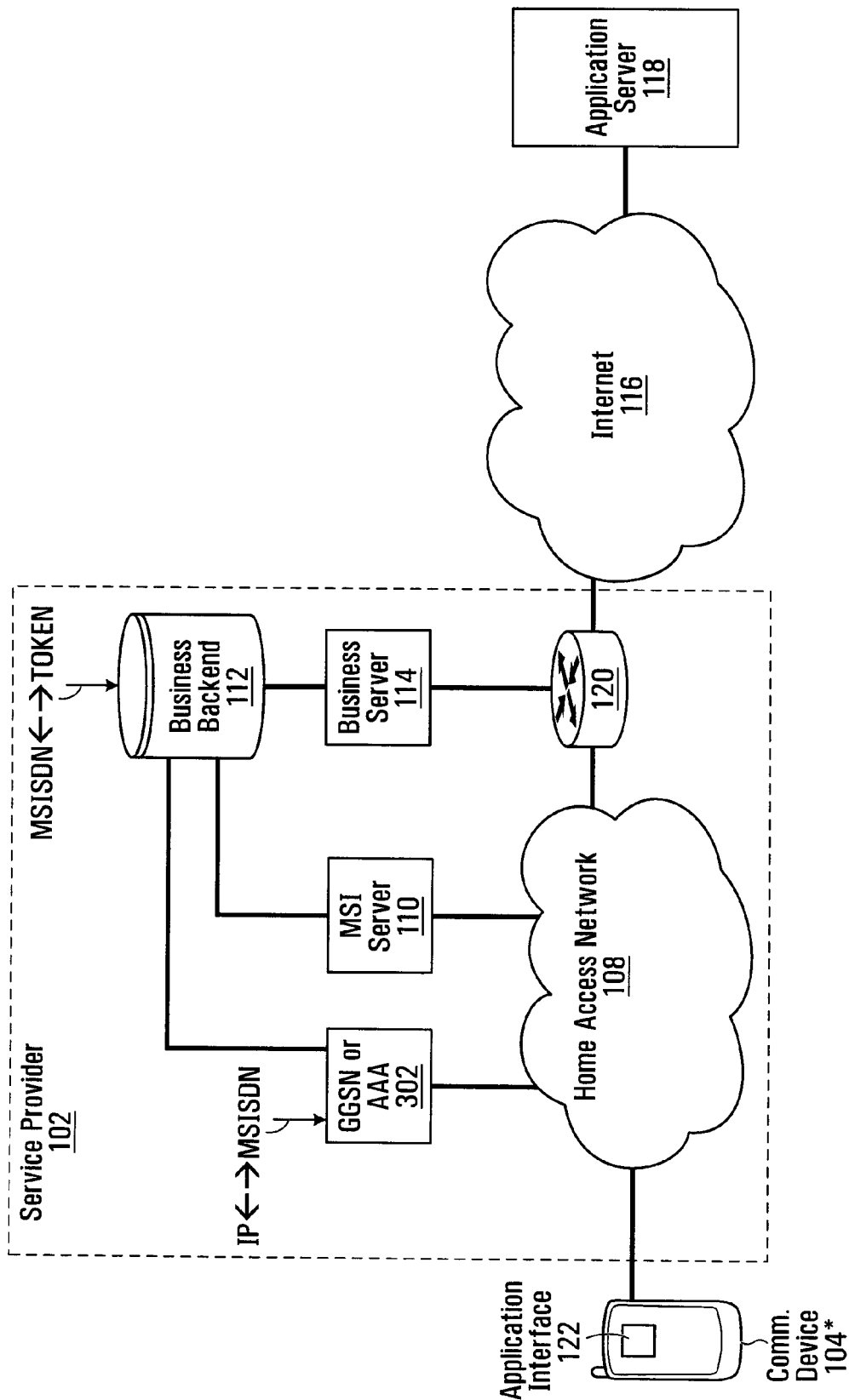
FIG. 3 is a block diagram of a network architecture in accordance with a non-limiting embodiment.

FIG. 3 shows an architecture that can be used in another non-limiting embodiment of the present invention. This architecture has many similarities to the architecture shown in FIG. 1 but also has several differences. In particular, a communication device 104\* is similar to communication device 104, but the presence of an identification device (such as a SIM card) that stores a unique identifier (such as an IMSI) is not required. In this embodiment, rather than rely on the IMSI, use is made of the MSISDN of communication device 104\*, which is stored in association with the customer account in the business backend 112. Therefore, the business backend 112 is aware of an association between the MSISDN of communication device 104\* and its corresponding token.

Scenario A: Customized Client-side Application 122

Figure 4A:
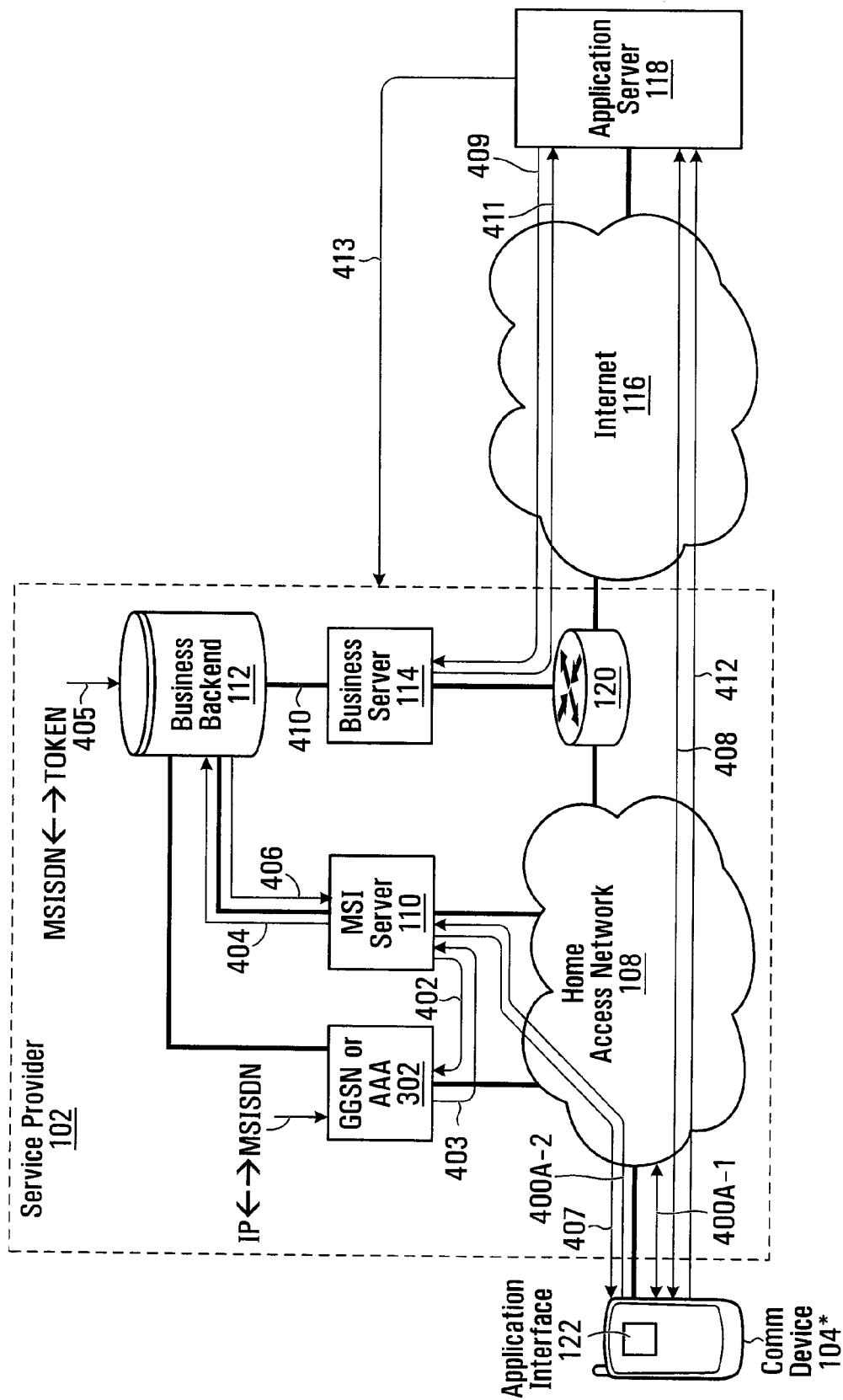
FIGS. 4A and 4B are flow diagrams amongst elements of the network architecture of FIG. 3, in accordance with non-limiting embodiments.
Figure 12:
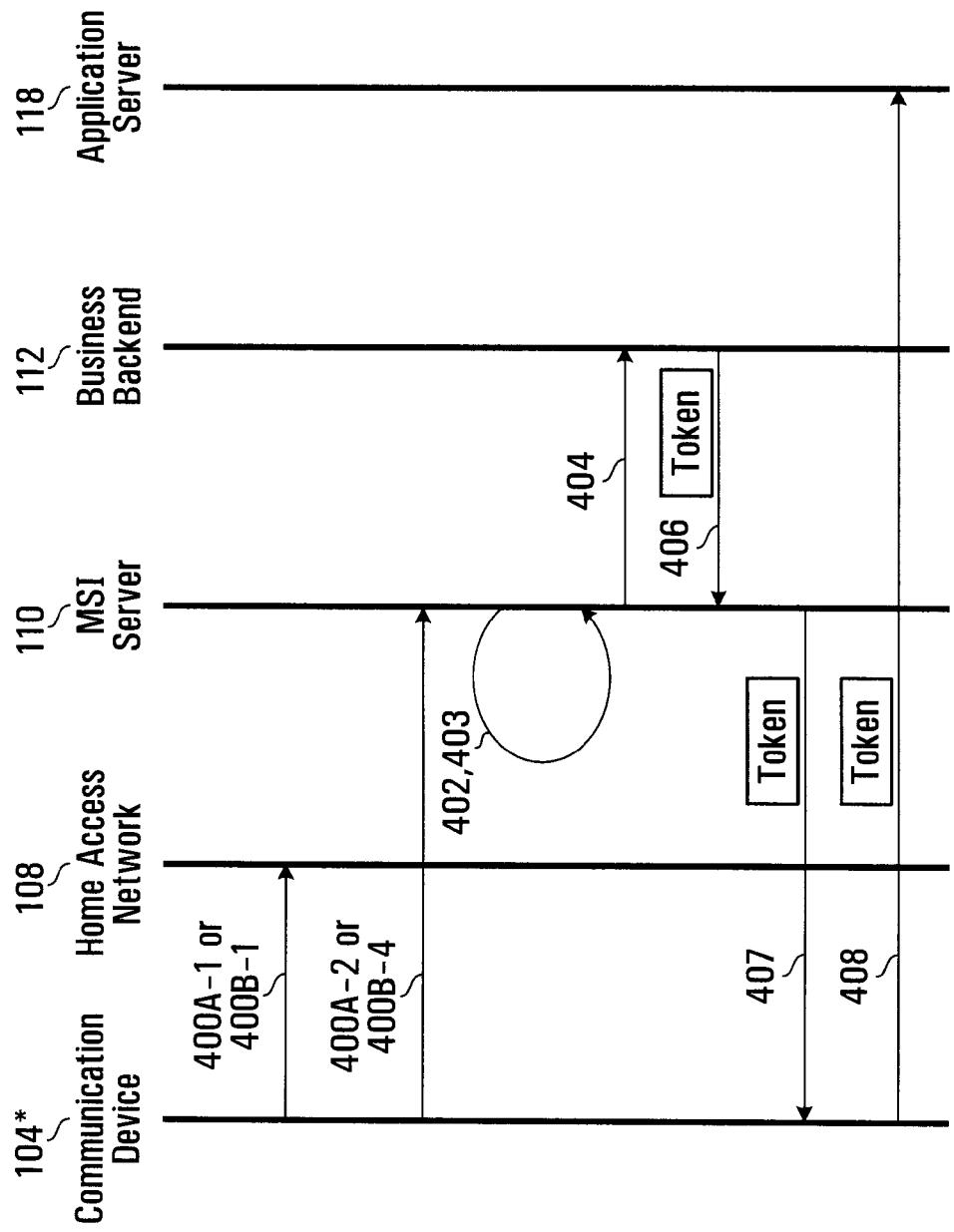
FIG. 12 is a flow diagram illustrating an example message flow that complements FIGS. 4A and 4B.

Consider now FIG. 4A which, together with FIG. 12, illustrates a message flow amongst the components illustrated in FIG. 3 that is applicable to a scenario where the client-side application 122 is specifically associated with a particular server-side application (e.g., it is downloaded from an application repository such as itunes Store™).

In phase 400A-1, communication device 104\* establishes a data connection with the home access network 108. During this process, and in a standard fashion, an entity (not shown) in the home access network 108 sends an identifier (e.g., a logical identifier such as an IP address) to communication device 104\* based on its directory number (e.g., its MSISDN). The IP address is a logical identifier that the service provider 102 has uniquely assigned to the MSISDN of communication device 104\*. The IP address may be statically assigned or it may be dynamically assigned and then maintained. The association between the IP address and the MSISDN may be stored in the business backend 112 or in a server such as the GGSN/AAA server 130.

In phase 400A-2, which can take place before, during or after phase 400A-1, a user of communication device 104\* activates the client-side application 122. This results in the transmission of a request to the MSI server 110. Specifically, the user can click on or otherwise select an icon displayed on communication device 104\*. An address of the MSI server 110 may be pre-programmed into the client-side application 122. Accordingly, upon having been activated, the client-side application 122 can be configured to automatically issue a request directed to the address of the MSI server 110. The address of the MSI server 110 can be an IP address, or it can be a URL, which is translated into an IP address by a domain name server (DNS) within the home access network 108.

Scenario B: Generic Client-side Application 122

Figure 4B:
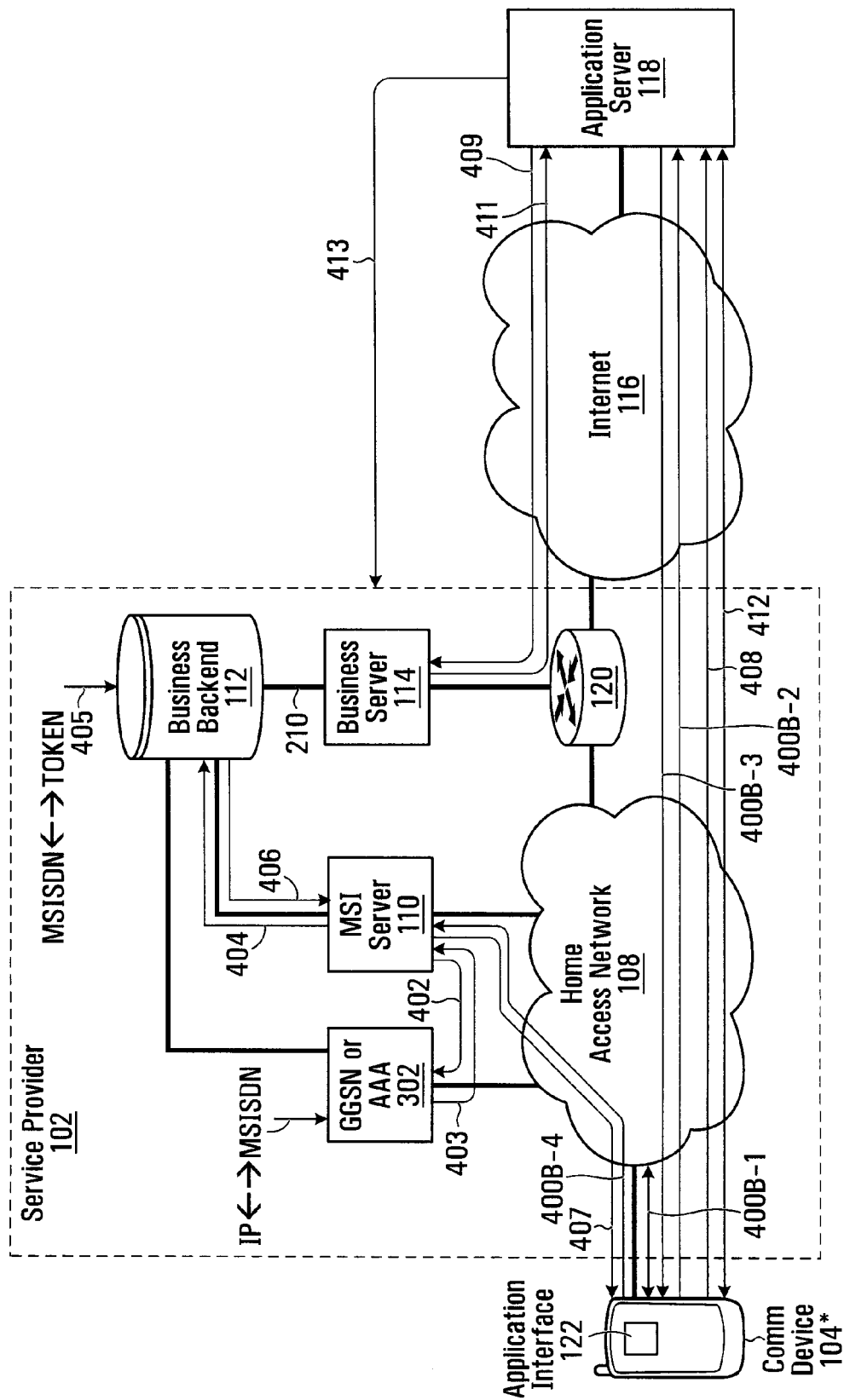

Consider now FIG. 4B which, together with FIG. 12, illustrates a message flow amongst the components illustrated in FIG. 3 that is applicable to a scenario where the client-side application 122 is generic (e.g., a web browser).

In phase 400B-1, communication device 104\* establishes a data connection with the home access network 108. During this process, and in a standard fashion, an entity (not shown) in the home access network 108 sends an identifier (e.g., a logical identifier such as an IP address) to communication device 104\* based on its directory number (e.g., its MSISDN). The IP address is a logical identifier that the service provider 102 has uniquely assigned to the MSISDN of communication device 104\*. The association between the IP address and the MSISDN may be stored in the GGSN/AAA server 130.

In phase 400B-2, upon gaining access to the home access network 108, communication device 104\* establishes a data connection with the application server 118 over the internet 116. This can be done using the client-side application 122 implemented as a web browser. During the data connection with the application server 118, the user of communication device 104\* requests execution of the particular server-side application on the application server 118. For example, this may be achieved by the user selecting a URL on a web page being displayed by the application server 118 via the client-side application 122. For illustrative purposes, a non-limiting example URL of the particular server-side application could be http://AppID.appserver.com.

In phase 400B-3, the application server 118 detects the request for execution of the particular server-side application. Based on the contents and/or form of the request, the application server 118 recognizes that communication device 104* is associated with the service provider 102 and that a token is required before it can proceed further. The application server 118 thus automatically redirects the client-side application 122 (e.g., the web browser) on communication device 104* to a predetermined address associated with the service provider 102 for the purpose of obtaining the token. The predetermined address may be the address of the MSI server 110.

In phase 400B-4, communication device 104* directs its request for a token to the MSI server 110. A non-limiting example of the request is a REST (representation state transfer) or other form of simple internet web service.

In both scenarios A and B, and referring now to both FIGS. 4A and 4B simultaneously, it will be observed that communication device 104* sends the request to the MSI server 110 over a path entirely within the domain of the service provider 102. As such, the request reaches the MSI server 110 over a channel that can be kept secure, and which only traverses network equipment that is within the domain of the service provider 102.

A non-limiting example of the request sent to the MSI server 110 would be "RESTful", i.e., in conformance with REST constraints. The following illustrates a possible formulation of the request to the MSI server 110:
URL http://msi.operator.com/token;appId=[AppID],
where AppID identifies the particular server-side application to be executed. It should be appreciated that the above example is used merely for illustrative purposes and in no way limits the scope of the invention. For example, the request can be formulated in accordance with SOAP- or Web Services Description Language (WSDL)-based principles.

In phase 402, the MSI server 110 receives the request from communication device 104*. The MSI server 110 determines the IP address of communication device 104*. This can be obtained from a header used in formulating the request. The MSI server 110 then sends a query to the GGSN/AAA server 130 on the basis of the IP address.

In phase 403, the GGSN/AAA server 130 attempts to determine the MSISDN corresponding to the IP address supplied by the MSI server 110. Assuming the attempt is successful, the GGSN/AAA server 130 returns the MSIDN (which is the MSISDN of communication device 104*) to the MSI server 110.

In phase 404, the MSI server 110 queries the business backend 112 on the basis of the MSIDN received from the GGSN/AAA server 130.

In phase 405, the business backend 112 receives the query from the MSI server 110 and attempts to determine the token uniquely corresponding to the MSISDN supplied by the MSI server 110. To this end, the business backend 112 consults one or more databases.

In phase 406, assuming the sought after token can be found in its databases, the business backend 112 returns the token to the MSI server 110.

In phase 407, the MSI server 110 releases the token to communication device 104* over the path previously established within the home access network 108. To the end, the token can be included in an XML response. The MSI server 110 may also release other profile information it has obtained from the business backend 112, such as language preference, account type (prepaid or postpaid), etc.

In phase 408, communication device 104* now issues a request directed to the application server 118, containing the token received from the MSI server 110. In a non-limiting embodiment, the client-side application 122 can cooperate with the operating system of communication device 104* in order to detect when the token has been received from the service provider 102, thereby triggering the request directed to the application server 118.

In scenario A, whereby the client-side application 122 is specifically associated with the particular server-side application, an address of the particular server-side application may be pre-programmed into the client-side application 122. For illustrative purposes, a non-limiting example address of the particular server-side application could be http://AppID.appserver.com. Accordingly, the client-side application 122 can be configured such that, upon receiving the token from the MSI server 110, it will automatically issue a request directed to the address of the server-side application (residing on the application server 118) and will supply the token. For illustrative purposes, the request could be issued to the URL http://AppID.appserver.com/token.

In scenario B, whereby the client-side application 122 is generic (e.g., a web browser), the client-side application 122 can be redirected to the URL associated with the particular server-side application that was originally entered by the user in phase 400B-2, while also supplying the token. For illustrative purposes, an example of the URL to which the web server could be directed is http://AppID.appserver.com/token.

The request, including the token, thus travels via the router/gateway 120 and over the internet 116 towards the application server 118. It is noted that the token is meaningless to an eavesdropper, because it is anonymous, i.e., it does not contain information that would allow information regarding the customer to be ascertained by someone outside the domain of the service provider 102.

In phase 409, the application server 118, upon receipt of the request containing the token, initiates an inquiry with the business server 114. Specifically, the application server 118 supplies the token to the business server 114 over a link. The link can be established over the internet 116 and can employ virtual private network (VPN) technology. Alternatively, establishment of the link can involve accessing a web-based portal of the service provider 102. The identity of the service provider 102 and/or the address of the business server 114 can be explicitly or implicitly specified in the content and/or format of the request received from communication device 104*. Thus, for example, the request may identify a URL where the business server 114 may be reached.

In phase 410, the business server 114 receives the token and consults one or more databases in the business backend 112 in order to identify the associated IMSI, which in this case is the IMSI of the identification device 106 inserted into communication device 104*. Based on the IMSI, the business server 114 obtains information about communication device 104*. The business server 114 then formulates a response which is sent to the application server 118. Non-limiting examples of the types of information about communication device 104* that may be obtained by the business server 114 have been provided above and need not be repeated here.

In phase 411, the response formulated by the business server 114 is released to the application server 118, e.g., over the internet 116. If necessary, the response may be sent over an encrypted channel established between the business server 114 and the application server 118.

In phase 412, and depending on the response to its inquiry as received from the service provider 102 in phase 211, the application server 118 may proceed to execute the particular server-side application. The particular server-side application can provide a television streaming service, a self-serve profile management service, a location-based service (e.g., identification of nearby restaurants, etc.) or any number of a wide variety of other possible services. During execution of the particular server-side application, the application server 118 can record/log parameters such as usage, queries made, and so on.

In phase 413, termination of the particular server-side application occurs. This can happen either under control of the application server 118 or of the user of communication device 104*. Account settlement and reconciliation may then take place. Various non-limiting examples have been described above with reference to FIGS. 2A and 2B and need not be repeated here.

Third Embodiment

Figure 5:
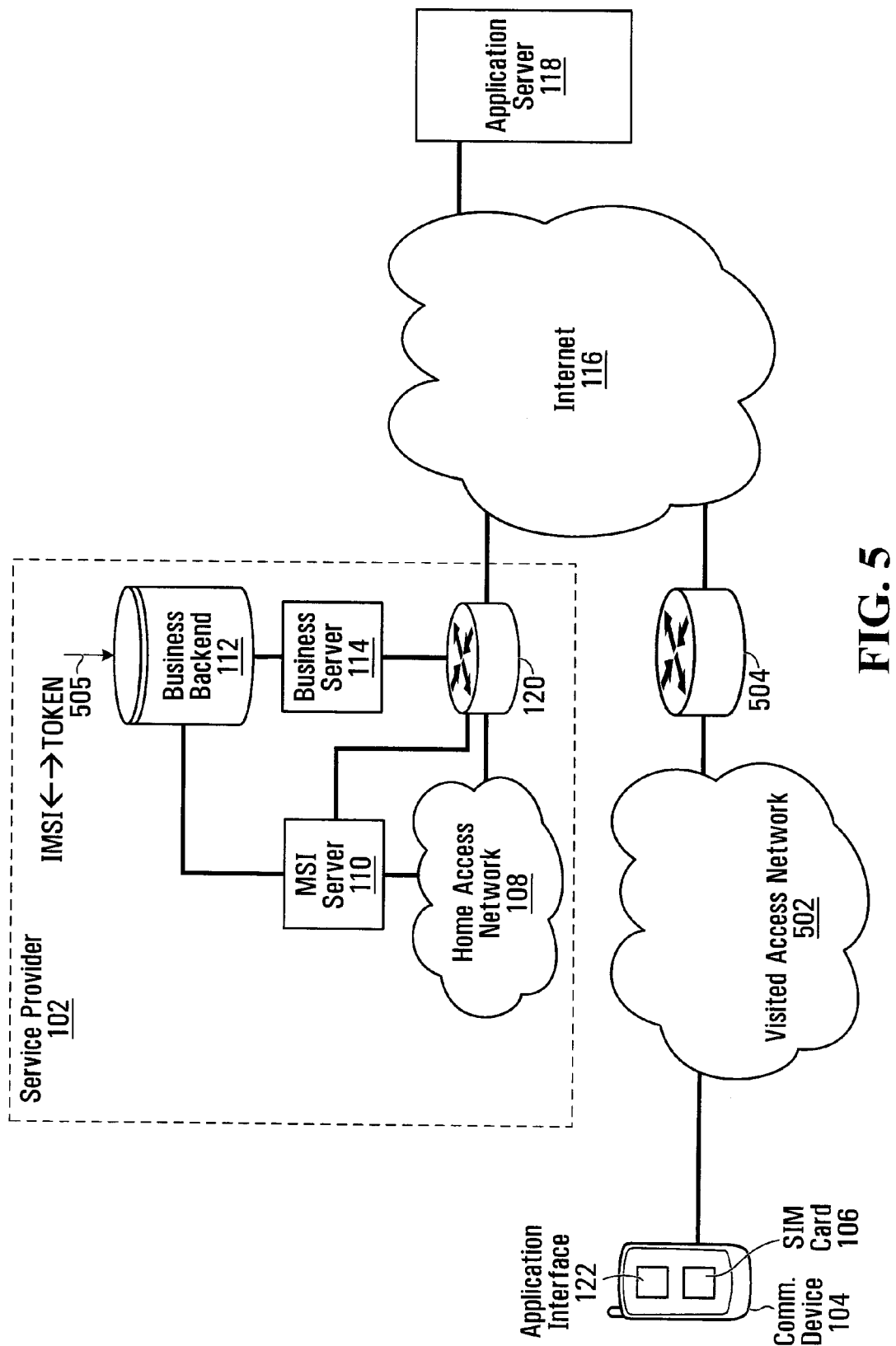
FIG. 5 is a block diagram of a network architecture in accordance with a non-limiting embodiment.

FIG. 5 shows an architecture that can be used in another non-limiting embodiment of the present invention. This architecture has many similarities to the architecture shown in FIG. 1 but also has several differences. In particular, communication device 104 does not have direct access to the home access network 108. Rather, communication device 104 establishes communication with a visited access network 502 operated by a third party service provider. The third party service provider has a commercial relationship with the service provider 102 for billing and service purposes; however, this relationship may or may not be a roaming partnership. In a roaming partnership, the third party service provider informs the service provider 102 as to the IP address that it has assigned to communication device 104 in the domain of the third party service provider 102. In a roaming non-partnership, the third party service provider does not necessarily provide such IP address visibility to the service provider 102. Thus, the present embodiment applies to a roaming partnership, as well as a roaming non-partnership (which includes a WiFi hotspot scenario). Also, for added emphasis, the MSI server 110 is shown as being accessible over the Internet 116 (illustrated by way of a connection to the router/gateway 120), which was not previously shown or required. Also, a router/gateway 504 links the visited access network 502 with the Internet 116.

Scenario A: Customized Client-side Application 122

Figure 6A:
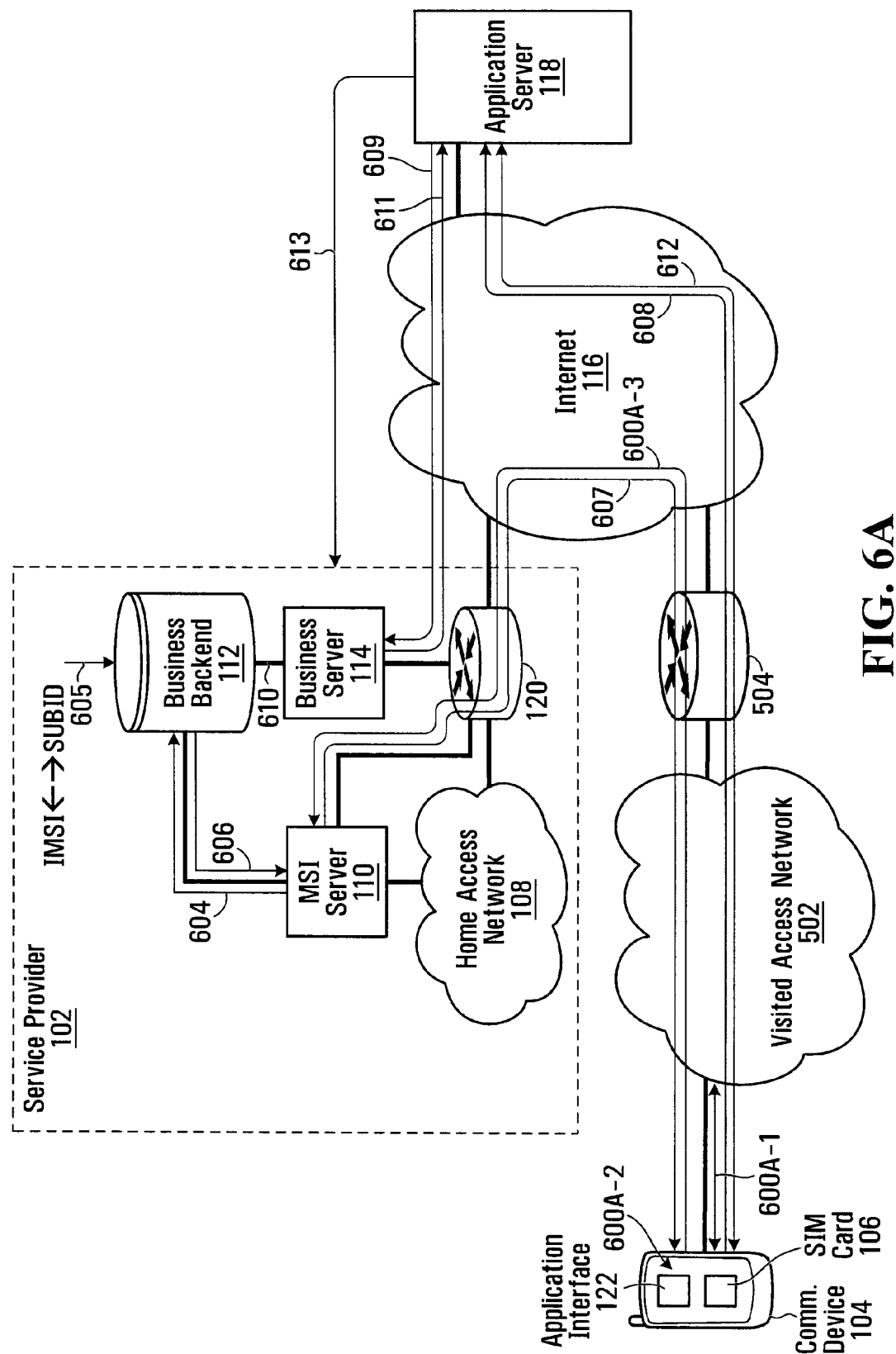
FIGS. 6A and 6B are flow diagrams amongst elements of the network architecture of FIG. 5, in accordance with non-limiting embodiments.

Consider now FIG. 6A, which illustrates a message flow amongst the components illustrated in FIG. 5 that is applicable to a scenario where the client-side application 122 is specifically associated with a particular server-side application (e.g., it is downloaded from an application repository such as itunes Store™).

In phase 600A-1, communication device 104 establishes a data connection with the visited access network 502. During this process, and in a standard fashion, an entity (not shown) in the home access network 502 sends an identifier (e.g., a logical identifier such as an IP address) to communication device 104 based on its directory number (e.g., its MSISDN). The IP address is a logical identifier that the third party service provider has uniquely assigned to the MSISDN of communication device 104. It is assumed that this data connection allows communication device 104 to access the internet 116 via the visited packet access network 502.

The IP address may be statically assigned or it may be dynamically assigned and then maintained by the third party service provider. The association between the IP address and the MSISDN is stored by the third party service provider but may remain unknown to the service provider 102, depending on whether or not there is a roaming partnership between the service provider 102 and the third party service provider.

In phase 600A-2, which can take place before, during or after phase 600A-1, communication device 104 extracts the device identifier (e.g., the IMSI) from the identification device 106 (e.g., the SIM card). This can be done using a lower layer protocol and/or operating system, as will be appreciated by those of skill in the art.

In phase 600A-3, a user of communication device 104 activates the client-side application 122. This results in the transmission of a request to the MSI server 110, wherein the request contains the IMSI extracted in phase 600A-2. Specifically, the user can click on or otherwise select an icon displayed on communication device 104. An address of the MSI server 110 may be pre-programmed into the client-side application 122. Accordingly, upon having been activated, the client-side application 122 can be configured to automatically issue a request directed to the address of the MSI server 110, which it is recalled, is reachable over the internet 116. The address of the MSI server 110 can be an IP address, or it can be a URL, which is translated into an IP address by a domain name server (DNS) within the visited access network 502.

Scenario B: Generic Client-side Application 122

Figure 6B:
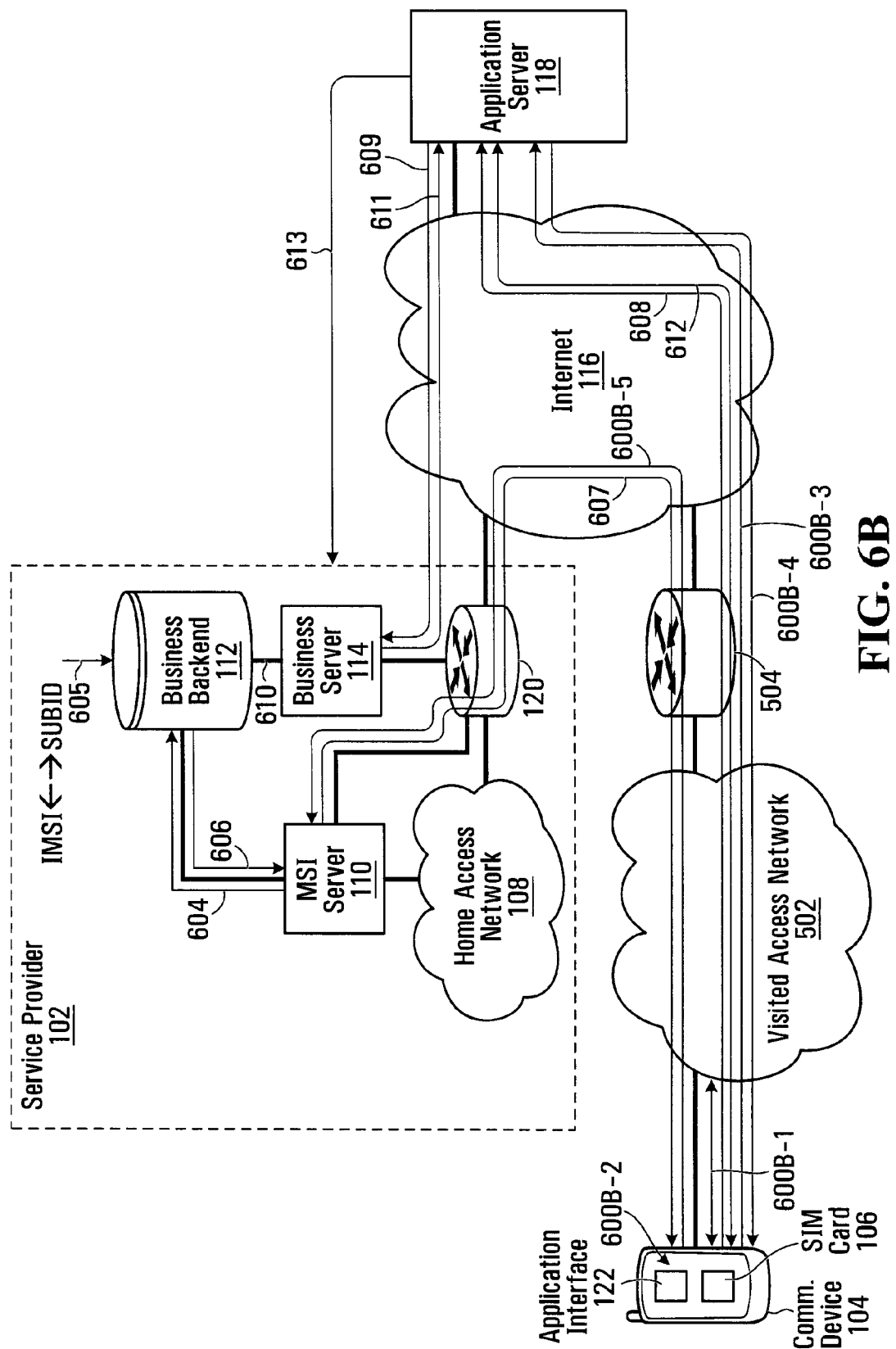

Consider now FIG. 6B, which illustrates a message flow amongst the components illustrated in FIG. 5 that is applicable to a scenario where the client-side application 122 is generic (e.g., a web browser).

In phase 600B-1, communication device 104 establishes a data connection with the visited access network 502. During this process, and in a standard fashion, an entity (not shown) in the home access network 108 sends an identifier (e.g., a logical identifier such as an IP address) to communication device 104 based on its directory number (e.g., its MSISDN). The IP address is a logical identifier that the third party service provider has uniquely assigned to the MSISDN of communication device 104. It is assumed that this data connection allows communication device 104 to access the internet 116 via the visited packet access network 502.

The IP address may be statically assigned or it may be dynamically assigned and then maintained by the third party service provider. The association between the IP address and the MSISDN is stored by the third party service provider but may remain unknown to the service provider 102, depending on whether or not there is a roaming partnership between the service provider 102 and the third party service provider.

In phase 600B-2, which can take place before, during or after phase 600B-1, communication device 104 extracts the device identifier (e.g., the IMSI) from the identification device 106 (e.g., the SIM card). This can be done using a lower layer protocol and/or operating system, as will be appreciated by those of skill in the art.

In phase 600B-3, upon gaining access to the visited access network 502, communication device 104 establishes a data connection with the application server 118 over the internet 116. This can be done using the client-side application 122 implemented as a web browser. During the data connection with the application server 118, the user of communication device 104 requests execution of the particular server-side application on the application server 118. For example, this may be achieved by the user selecting a URL on a web page being displayed by the application server 118 via the client-side application 122. For illustrative purposes, a non-limiting example URL of the particular server-side application could be http://AppID.appserver.com.

In phase 600B-4, the application server 118 detects the request for execution of the particular server-side application. Based on the contents and/or form of the request, the application server 118 recognizes that communication device 104 is associated with the service provider 102 and that a token is required before it can proceed further. The application server 118 thus automatically redirects the client-side application 122 (e.g., the web browser) on communication device 104 to a predetermined address associated with the service provider 102 for the purpose of obtaining the token. The predetermined address may be the address of the MSI server 110 which, it is recalled, is reachable over the internet 116.

In phase 600B-5, communication device 104 directs its request for a token to the MSI server 110. The request contains the IMSI extracted in phase 600B-2.

In both scenarios A and B, and referring now to both FIGS. 6A and 6B simultaneously, although the request sent to the MSI server 110 does not remain entirely within the domain of the service provider 102, the information it carries (e.g., the IMSI) can be kept secure by encrypting it using a shared secret between communication device 104 and the MSI server 110.

In phase 604, the MSI server 110 receives the request, containing the potentially encrypted IMSI, from communication device 104. The MSI server 110 determines the IMSI (potentially through decryption, using knowledge of the shared secret) and sends a query to the business backend 112 on the basis of the IMSI.

In phase 605, the business backend 112 receives the query from the MSI server 110 and attempts to find the token uniquely corresponding to the IMSI supplied by the MSI server 110. To this end, the business backend 112 consults one or more databases.

In phase 606, assuming the sought after token can be found in its databases, the business backend 112 returns the token to the MSI server 110.

In phase 607, the MSI server 110 releases the token to communication device 104 over the path previously established via the visited access network 502 (and which may traverse the internet 116). To the end, the token can be included in an XML response. The MSI server 110 may also release other profile information it has obtained from the business backend 112, such as language preference, account type (prepaid or postpaid), etc.

In phase 608, communication device 104 now issues a request directed to the application server 118, containing the token received from the MSI server 110. In a non-limiting embodiment, the client-side application 122 can cooperate with the operating system of communication device 104 in order to detect when the token has been received from the service provider 102, thereby triggering the request directed to the application server 118.

In scenario A, whereby the client-side application 122 is specifically associated with the particular server-side application, an address of the particular server-side application may be pre-programmed into the client-side application 122. Accordingly, the client-side application 122 can be configured such that, upon receiving the token from the MSI server 110, it will automatically issue a request directed to the address of the server-side application (residing on the application server 118). The address of the server-side application can be an IP address, or it can be a URL, which is translated into an IP address by a domain name server (DNS) within the visited access network 502.

In scenario B, whereby the client-side application 122 is generic (e.g., a web browser), the client-side application 122 can be redirected to the URL associated with the particular server-side application that was originally entered by the user in phase 600B-3.

The request, including the token, thus travels via the router/gateway 504 and over the internet 116 towards the application server 118. It is noted that the token is meaningless to an eavesdropper in the visited access network 502, because it is anonymous, i.e., it does not contain information that would allow information regarding the customer to be ascertained by someone outside the domain of the service provider 102.

In phase 609, the application server 118, upon receipt of the request containing the token, initiates an inquiry with the business server 114. Specifically, the application server 118 supplies the token to the business server 114 over a link. The link can be established over the internet 116 and can employ virtual private network (VPN) technology. Alternatively, establishment of the link can involve accessing a web-based portal of the service provider 102. The identity of the service provider 102 and/or the address of the business server 114 can be explicitly or implicitly specified in the content and/or format of the request received from communication device 104. Thus, for example, the request may identify a URL where the business server 114 may be reached.

In phase 610, the business server 114 receives the token and consults one or more databases in the business backend 112 in order to identify the associated IMSI, which in this case is the IMSI of the identification device 106 inserted into communication device 104. Based on the IMSI, the business server 114 obtains information about communication device 104. The business server 114 then formulates a response which is sent to the application server 118. Non-limiting examples of the types of information about communication device 104 that may be obtained by the business server 114 have been provided above and need not be repeated here.

In phase 611, the response formulated by the business server 114 is released to the application server 118, e.g., over the internet 116. If necessary, the response may be sent over an encrypted channel established between the business server 114 and the application server 118.

In phase 612, and depending on the response to its inquiry as received from the service provider 102 in phase 211, the application server 118 may proceed to execute the particular server-side application. The particular server-side application can provide a television streaming service, a self-serve profile management service, a location-based service (e.g., identification of nearby restaurants, etc.) or any number of a wide variety of other possible services. During execution of the particular server-side application, the application server 118 can record/log parameters such as usage, queries made, and so on.

In phase 613, termination of the particular server-side application occurs. This can happen either under control of the application server 118 or of the user of communication device 104. Account settlement and reconciliation may then take place. Various non-limiting examples of this have been described above with reference to FIGS. 2A and 2B and need not be repeated here.

Fourth Embodiment

Figure 7:
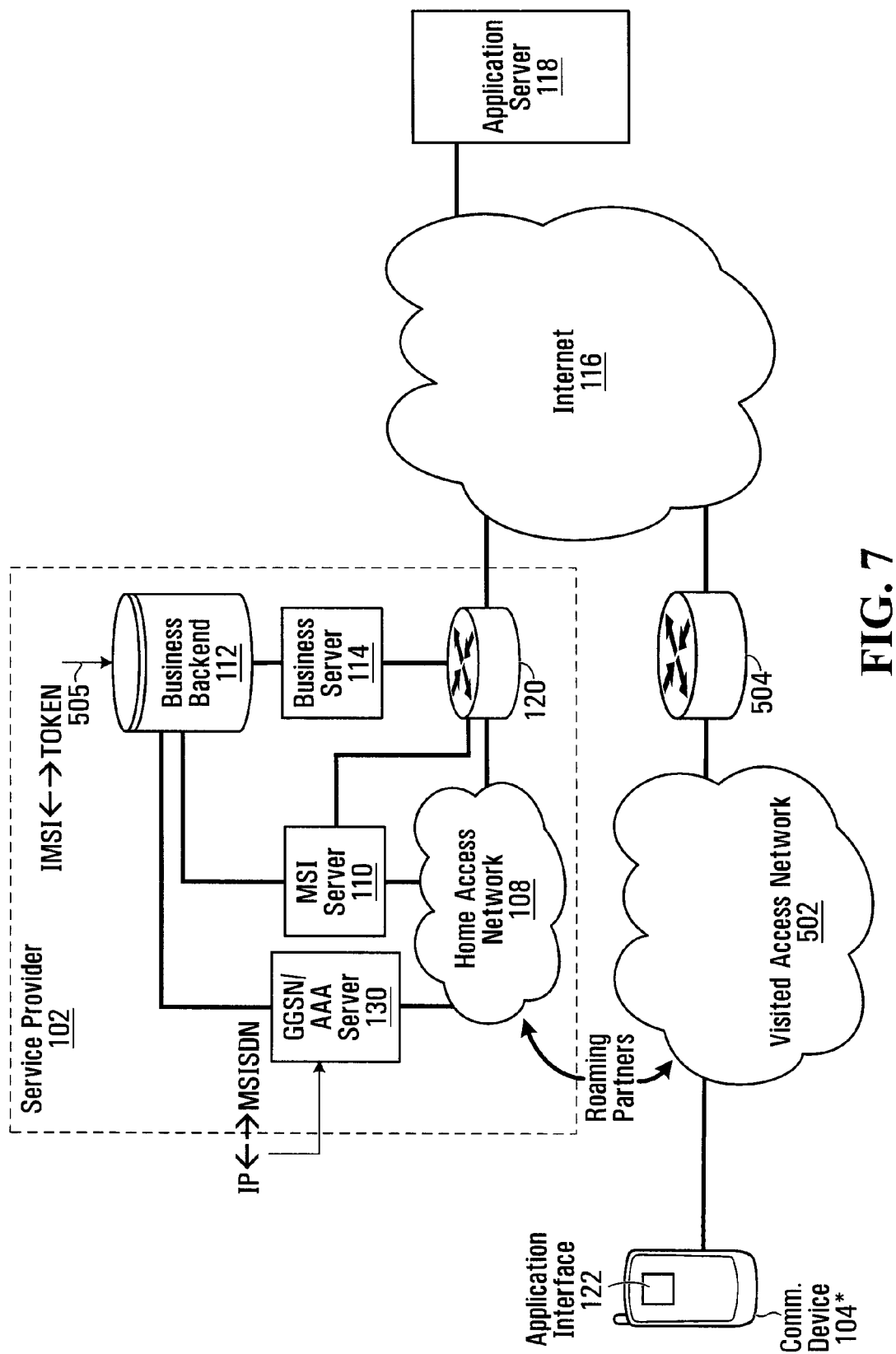
FIG. 7 is a block diagram of a network architecture in accordance with a non-limiting embodiment.

FIG. 7 shows an architecture that can be used in another non-limiting embodiment of the present invention. This architecture has many similarities to the architecture shown in FIG. 5 but also has several differences. In particular, reference is again made to communication device 104*, which is similar to communication device 104, but the presence of an identification device (such as a SIM card) that stores a unique identifier (such as an IMSI) is not required. In this embodiment, rather than rely on the IMSI, use is made of the MSISDN of communication device 104*, which is stored in association with the customer account in the business backend 112. Therefore, the business backend 112 is aware of an association between the MSISDN of communication device 104* and its corresponding token. Also, in this embodiment, the third party service provider is in a roaming partnership with the service provider 102. As such, the third party service provider will inform the service provider 102 as to the IP address that it assigns to communication devices that are registered with the service provider 102 but are currently operating within the domain of the third party service provider.

Scenario A: Customized Client-side Application 122

Figure 8A:
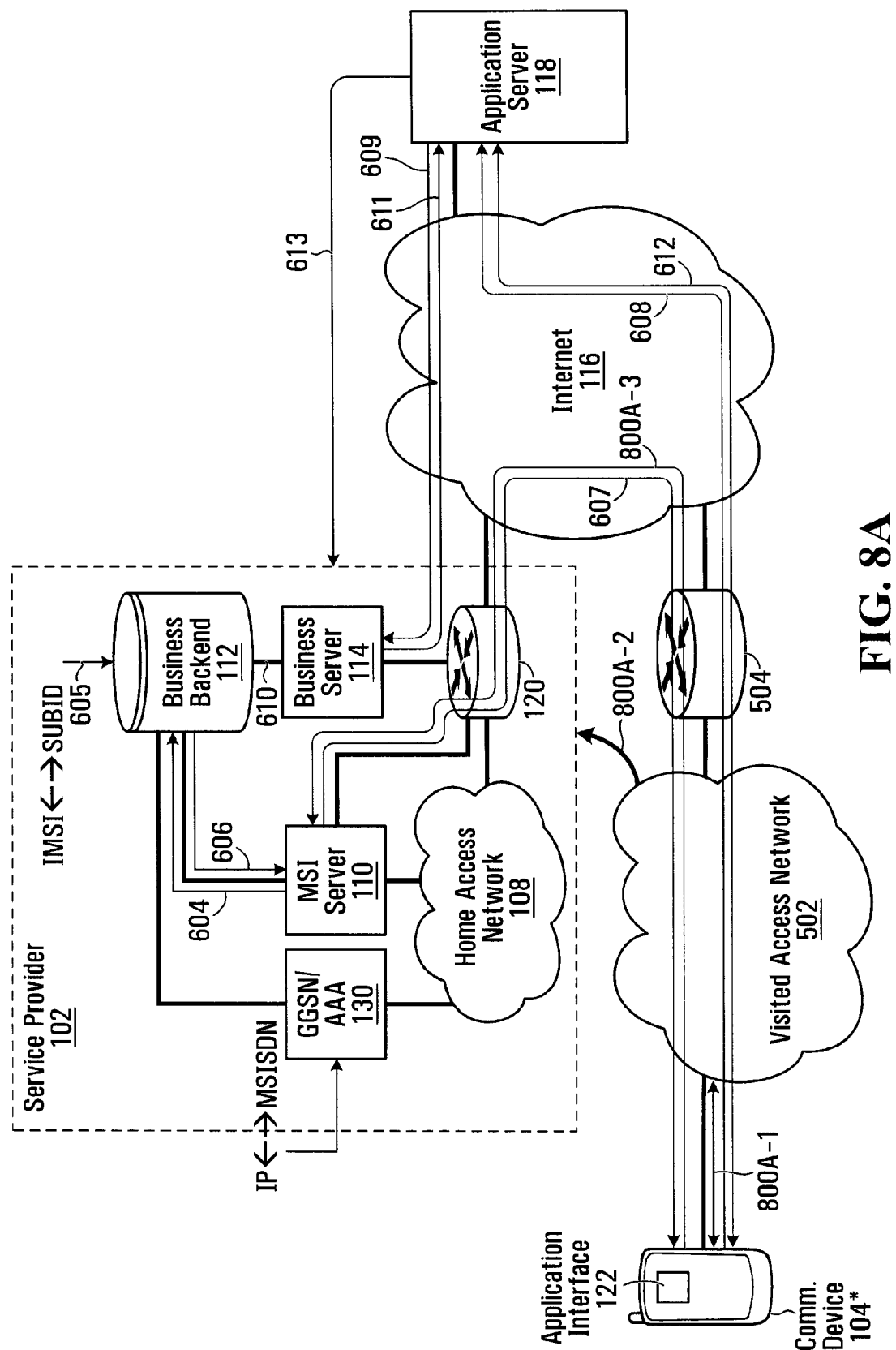
FIGS. 8A and 8B are flow diagrams amongst elements of the network architecture of FIG. 7, in accordance with non-limiting embodiments.

Consider now FIG. 8A, which illustrates a message flow amongst the components illustrated in FIG. 7 that is applicable to a scenario where the client-side application 122 is specifically associated with a particular server-side application (e.g., it is downloaded from an application repository such as itunes Store™).

In phase 800A-1, communication device 104 establishes a data connection with the visited access network 502. During this process, and in a standard fashion, an entity (not shown) in the visited access network 502 sends an identifier (e.g., a logical identifier such as an IP address) to communication device 104\* based on its directory number (e.g., its MSISDN). The IP address is a logical identifier that the third party service provider has uniquely assigned to the MSISDN of communication device 104\*. It is assumed that this data connection allows communication device 104\* to access the internet 116 via the visited packet access network 502. The IP address may be statically assigned or it may be dynamically assigned and then maintained by the third party service provider. The association between the IP address and the MSISDN of communication device 104\* is thus controlled by the third party service provider.

In phase 800A-2, the third party service provider conveys the association between the IP address of communication device 104\* and the MSISDN of communication device 104\* to the service provider 102 (by sending such association to an agreed-upon entity such as, for example, the MSI server 110 or the business server 114). This transmission occurs by virtue of the existence of a roaming partnership between the service provider 102 and the third party service provider. Upon receipt from the third party service provider, the association between the IP address of communication device 104\* and the MSISDN of communication device 104\* may be stored in the business backend 112 or in a server such as the GGSN/AAA server 130.

In phase 800A-3, a user of communication device 104\* activates the client-side application 122. This results in the transmission of a request to the MSI server 110. Specifically, the user can click on or otherwise select an icon displayed on communication device 104\*. An address of the MSI server 110 may be pre-programmed into the client-side application 122. Accordingly, upon having been activated, the client-side application 122 can be configured to automatically issue a request directed to the address of the MSI server 110. The address of the MSI server 110 can be an IP address, or it can be a URL, which is translated into an IP address by a domain name server (DNS) within the visited access network 502.

Scenario B: Generic Client-side Application 122

Figure 8B:
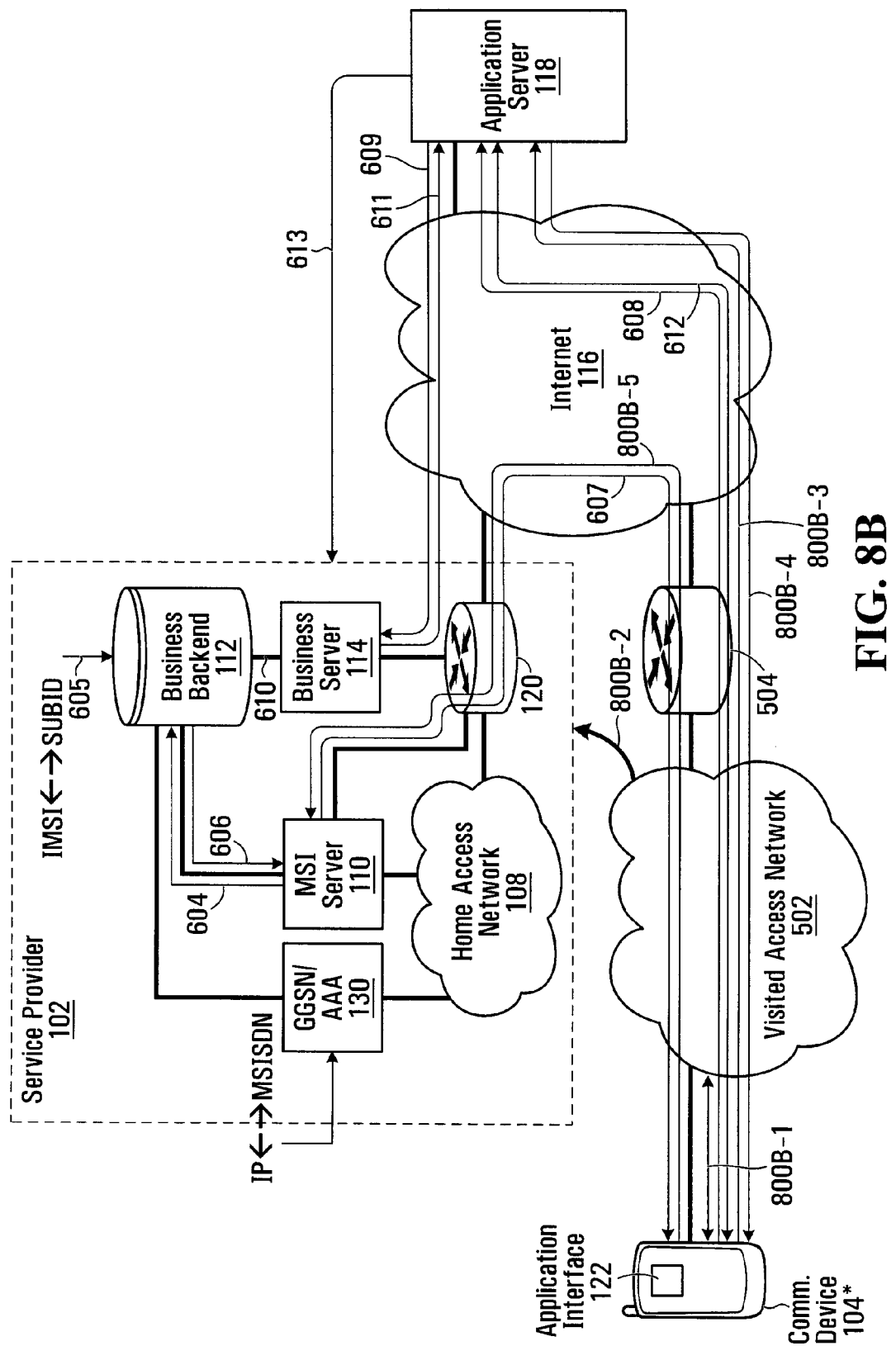

Consider now FIG. 8B, which illustrates a message flow amongst the components illustrated in FIG. 7 that is applicable to a scenario where the client-side application 122 is generic (e.g., a web browser).

In phase 800B-1, communication device 104\* establishes a data connection with the visited access network 502. During this process, and in a standard fashion, an entity (not shown) in the visited access network 502 sends an identifier (e.g., a logical identifier such as an IP address) to communication device 104\* based on its directory number (e.g., its MSISDN). The IP address is a logical identifier that the third party service provider has uniquely assigned to the MSISDN of communication device 104\*. It is assumed that this data connection allows communication device 104\* to access the internet 116 via the visited packet access network 502. The IP address may be statically assigned or it may be dynamically assigned and then maintained by the third party service provider. The association between the IP address and the MSISDN of communication device 104\* is thus controlled by the third party service provider.

In phase 800B-2, the third party service provider conveys the association between the IP address of communication device 104\* and the MSISDN of communication device 104\* to the service provider 102 (by sending such association to an agreed-upon entity such as, for example, the MSI server 110 or the business server 114). This transmission occurs by virtue of the existence of a roaming partnership between the service provider 102 and the third party service provider. Upon receipt from the third party service provider, the association between the IP address of communication device 104\* and the MSISDN of communication device 104\* may be stored in the business backend 112 or in a server such as the GGSN/AAA server 130.

In phase 800B-3, upon gaining access to the visited access network 502, communication device 104\* establishes a data connection with the application server 118 over the internet 116. This can be done using the client-side application 122 implemented as a web browser. During the data connection with the application server 118, the user of communication device 104\* requests execution of the particular server-side application on the application server 118. For example, this may be achieved by the user selecting a URL on a web page being displayed by the application server 118 via the client-side application 122. For illustrative purposes, a non-limiting example URL of the particular server-side application could be http://AppID.appserver.com.

In phase 800B-4, the application server 118 detects the request for execution of the particular server-side application. Based on the contents and/or form of the request, the application server 118 recognizes that communication device 104\* is associated with the service provider 102 and that a token is required before it can proceed further. The application server 118 thus automatically redirects the client-side application 122 (e.g., the web browser) on communication device 104\* to a predetermined address associated with the service provider 102 for the purpose of obtaining the token. The predetermined address may be the address of the MSI server 110 which, it is recalled, is reachable over the internet 116.

In phase 800B-5, communication device 104\* directs its request for a token to the MSI server 110.

Phases 604 through 613 are identical to the correspondingly numbered phases previously described with reference to FIGS. 6A and 6B.

Fifth Embodiment

Figure 9:
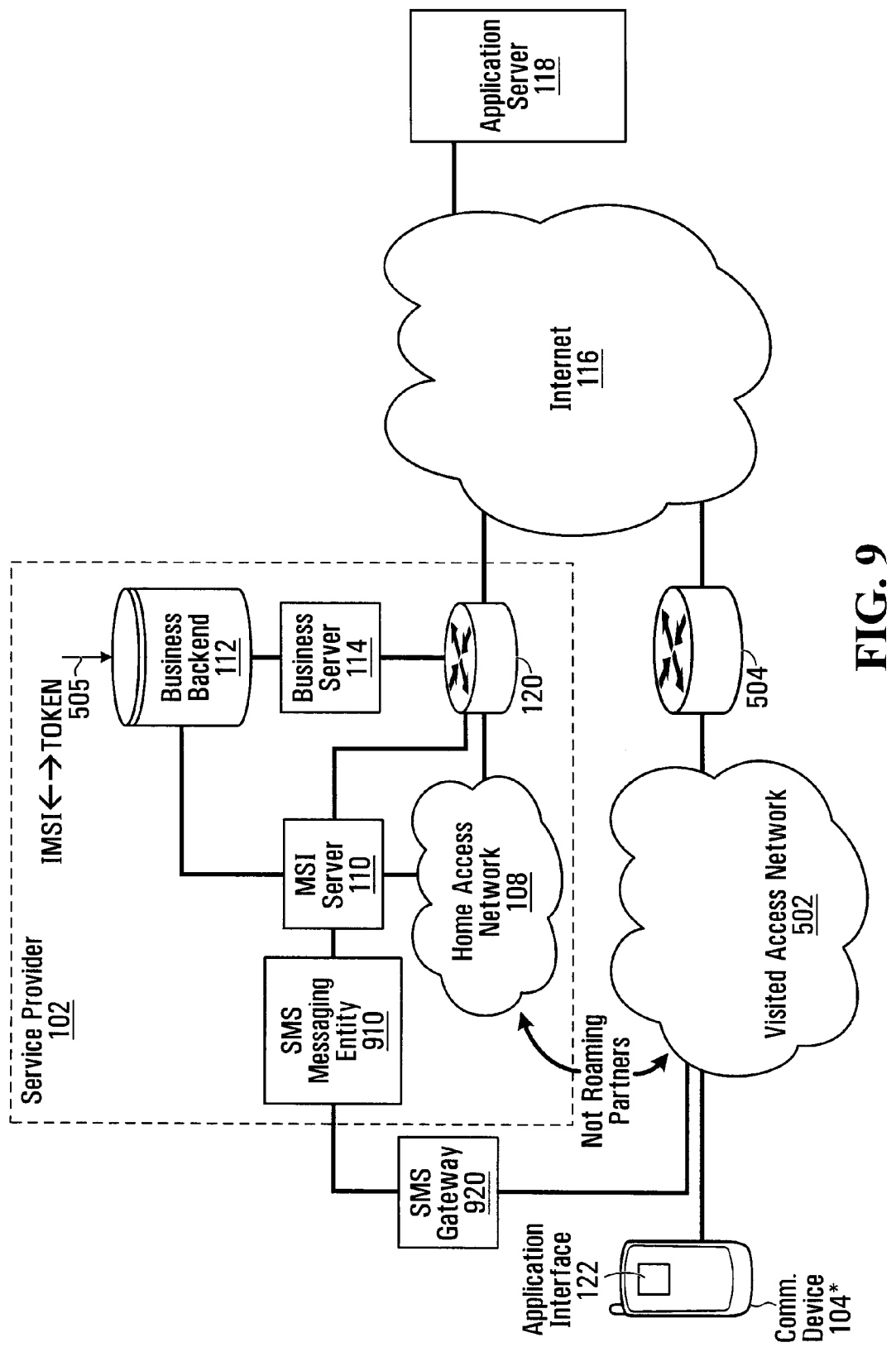
FIG. 9 is a block diagram of a network architecture in accordance with a non-limiting embodiment.

FIG. 9 shows an architecture that can be used in another non-limiting embodiment of the present invention. This architecture has many similarities to the architecture shown in FIG. 7 but also has several differences. In particular, the third party service provider is assumed not to be in a roaming partnership with the service provider 102. This could be the case in a WiFi hotspot environment, for example. As such, it is assumed that the service provider 102 is unaware of the IP address that the third party service provider assigns to communication devices (such as communication device 104\*) that are currently operating in the domain of the third party service provider. Also, there is provided an SMS messaging entity 910 within the domain of the service provider 102 and which is configured to send SMS messages. The SMS messaging entity 910 is connected to the MSI server 110. Also, the SMS messaging entity 910 cooperates with an SMS gateway 920 that is connected (either directly or indirectly) to the visited access network 502 (and/or to the internet 116), so as to enable the delivery of SMS messages to communication device 104*.

Scenario A: Customized Client-side Application 122

Figure 10A:
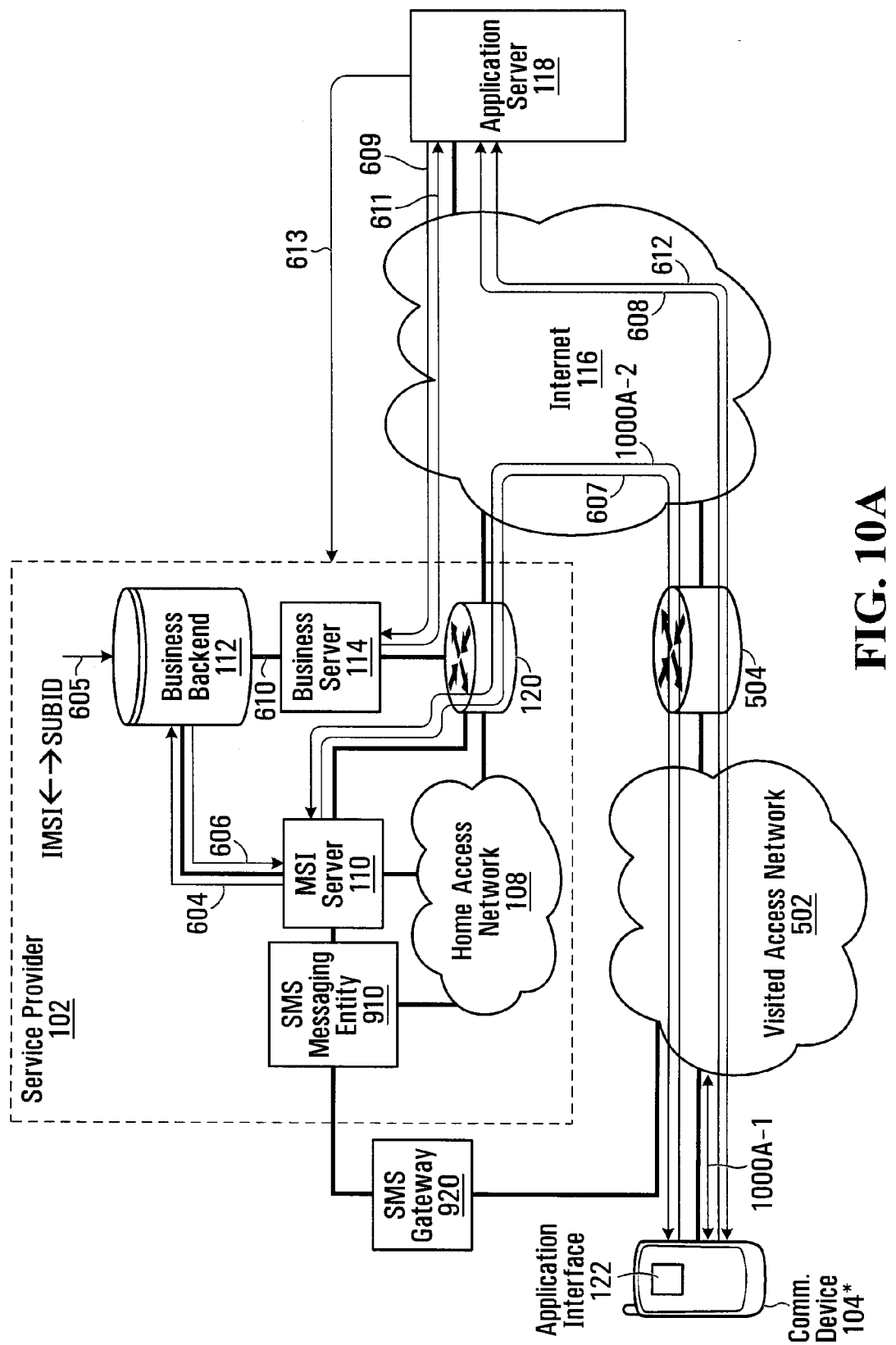
FIGS. 10A and 10B are flow diagrams amongst elements of the network architecture of FIG. 9, in accordance with non-limiting embodiments.

Consider now FIG. 10A, which illustrates a message flow amongst the components illustrated in FIG. 9 that is applicable to a scenario where the client-side application 122 is specifically associated with a particular server-side application (e.g., it is downloaded from an application repository such as itunes Store™).

In phase 1000A-1, communication device 104 establishes a data connection with the visited access network 502. During this process, and in a standard fashion, an entity (not shown) in the visited access network 502 sends an identifier (e.g., a logical identifier such as an IP address) to communication device 104* based on its directory number (e.g., its MSISDN). The IP address is a logical identifier that the third party service provider has uniquely assigned to the MSISDN of communication device 104*. It is assumed that this data connection allows communication device 104* to access the internet 116 via the visited packet access network 502. The IP address may be statically assigned or it may be dynamically assigned and then maintained by the third party service provider. The association between the IP address and the MSISDN of communication device 104* is thus controlled by the third party service provider. However, in the current embodiment, this association is not conveyed to the service provider 102.

In phase 1000A-2, a user of communication device 104* activates the client-side application 122. This results in the transmission of a request to the MSI server 110. Specifically, the user can click on or otherwise select an icon displayed on communication device 104*. An address of the MSI server 110 may be pre-programmed into the client-side application 122. Accordingly, upon having been activated, the client-side application 122 can be configured to automatically issue a request directed to the address of the MSI server 110. The address of the MSI server 110 can be an IP address, or it can be a URL, which is translated into an IP address by a domain name server (DNS) within the visited access network 502.

Scenario B: Generic Client-side Application 122

Figure 10B:
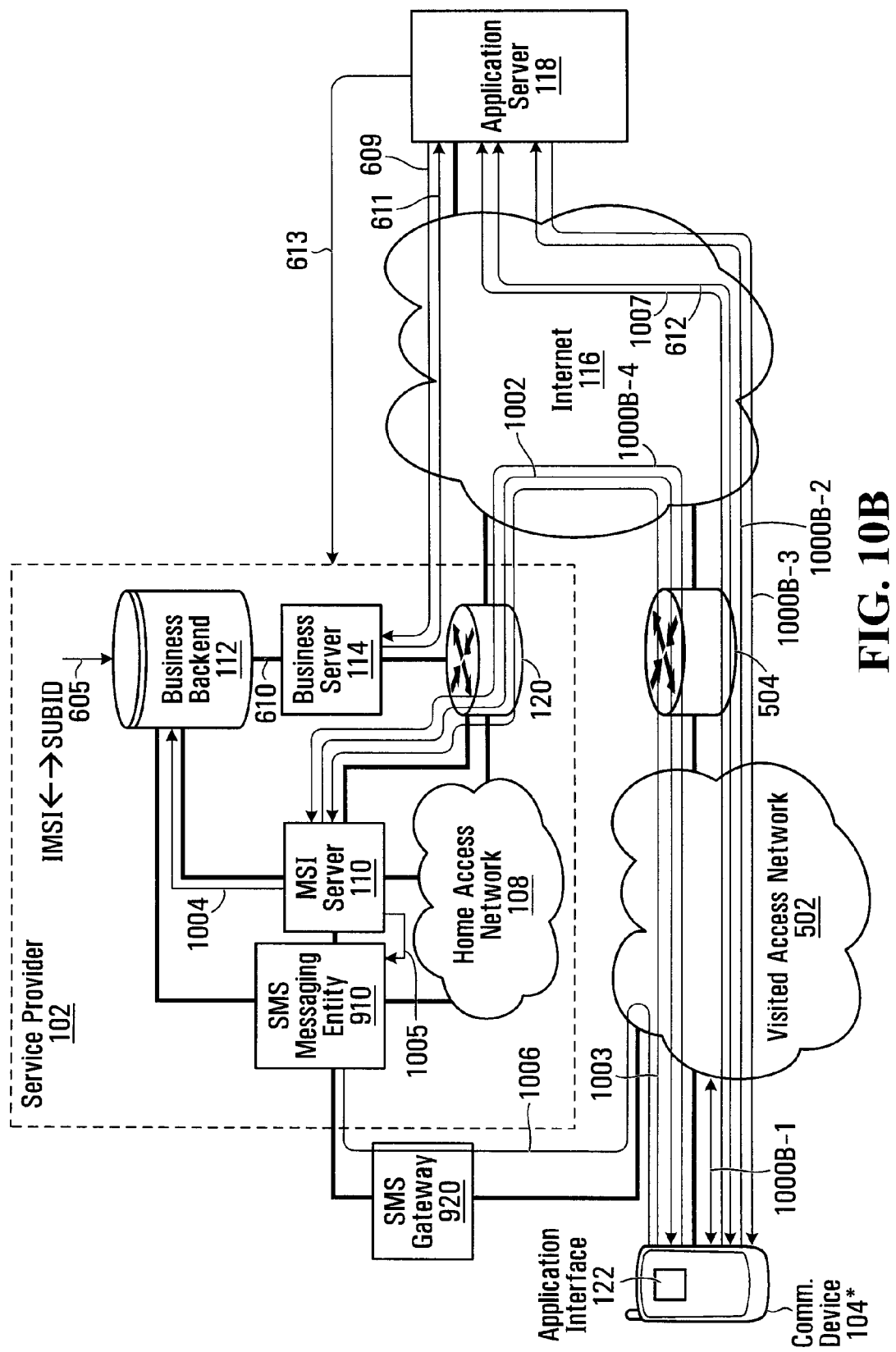

Consider now FIG. 10B, which illustrates a message flow amongst the components illustrated in FIG. 9 that is applicable to a scenario where the client-side application 122 is generic (e.g., a web browser).

In phase 1000B-1, communication device 104* establishes a data connection with the visited access network 502. During this process, and in a standard fashion, an entity (not shown) in the visited access network 502 sends an identifier (e.g., a logical identifier such as an IP address) to communication device 104* based on its directory number (e.g., its MSISDN). The IP address is a logical identifier that the third party service provider has uniquely assigned to the MSISDN of communication device 104*. It is assumed that this data connection allows communication device 104* to access the internet 116 via the visited packet access network 502. The IP address may be statically assigned or it may be dynamically assigned and then maintained by the third party service provider. The association between the IP address and the MSISDN of communication device 104* is thus controlled by the third party service provider. However, it is recalled that in the current embodiment, this association is not conveyed to the service provider 102.

In phase 1000B-2, upon gaining access to the visited access network 502, communication device 104* establishes a data connection with the application server 118 over the internet 116. This can be done using the client-side application 122 implemented as a web browser. During the data connection with the application server 118, the user of communication device 104* requests execution of the particular server-side application on the application server 118. For example, this may be achieved by the user selecting a URL on a web page being displayed by the application server 118 via the client-side application 122. For illustrative purposes, a non-limiting example URL of the particular server-side application could be http://AppID.appserver.com.

In phase 1000B-3, the application server 118 detects the request for execution of the particular server-side application. Based on the contents and/or form of the request, the application server 118 recognizes that communication device 104* is associated with the service provider 102 and that a token is required before it can proceed further. The application server 118 thus automatically redirects the client-side application 122 (e.g., the web browser) on communication device 104* to a predetermined address associated with the service provider 102 for the purpose of obtaining the token. The predetermined address may be the address of the MSI server 110 which, it is recalled, is reachable over the internet 116.

In phase 1000B-4, communication device 104* directs its request for a token to the MSI server 110.

In both scenarios A and B, and referring now to both FIGS. 10A and 10B simultaneously, it will be observed that the request sent to the MSI server 110 is devoid of any token, but identifies the particular server-side application to be executed. By way of example, "AppID" could be used as an identifier of the particular server-side application.

In phase 1002, the MSI server 110 determines that the received request lacks a token. Accordingly, the MSI server 110 issues a request to communication device 104*, in which the user of communication device 104* is asked to enter the MSISDN associated with communication device 104*.

In phase 1003, the user of communication device 104* provides a putative MSISDN, e.g., a 10-digit phone number. The user-provided MSISDN is received by the MSI server 110. The user of communication device 104* may be alerted to receipt of the request from the MSI server 110 (e.g., by means of a visual or audio signal).

In phase 1004, the MSI server 110 consults one or more databases in the business backend 112 in order to identify the customer account and the token associated with the user-provided MSISDN.

In phase 1005, the MSI server 110 interacts with the SMS messaging entity 910 to cause issuance of an SMS message addressed to the user-provided MSISDN. The SMS message may be formulated so as to resemble a URL that supplies the token to the address of the particular server-side application. For illustrative purposes, a non-limiting example URL could be http://AppID.appserver.com/token. The address of the particular server-side application can be obtained from a database, based on AppID, which was provided by the application server 118.

In phase 1006, the SMS message reaches communication device 104* via the SMS gateway 920 and the visited access network 502. (Naturally, this assumes that the user-provided MSISDN is indeed the MSISDN of communication device 104*. If it is not, namely if the user-provided MSISDN is that of a different communication device, then the SMS message will be received by the user of such different communication device, who will not expect to receive this particular SMS message and therefore may—not unreasonably—suspect that an error or intrusion has taken place.) An SMS utility executed by communication device 104* may issue a signal to alert the user of communication device 104* that the SMS message has arrived. An action can be taken such as to read the received SMS message and activate its contents. That is to say, the SMS utility may permit instantiation of a web browser upon recognition of a certain string of characters. For example, a browser can be instantiated upon recognizing the URL http://AppID.appserver.com/token.

In phase 1007, the newly instantiated web browser requests a session with the URL http://AppID.appserver.com/token, which can be located on the application server 118, reachable over the internet 116. The request, including the token, thus travels via the router/gateway 504 and over the internet 116 towards the application server 118. It is noted that the token is meaningless to an eavesdropper, because it is anonymous, i.e., does not contain information that would allow information regarding the customer to be ascertained by someone outside the domain of the service provider 102.

Phases 609 through 613 are identical to the correspondingly numbered phases previously described with reference to FIGS. 6A and 6B.

Those skilled in the art will appreciate that although the example of SMS has been used, this is but one of many examples where the token is transmitted over a different communication link than was used to request the directory number. For example, in phase 1002, the MSI server 110 may request a customer's email address and send an email message containing the token in phase 1005. The email message might reach the mobile device over a different path than the SMS message or any of the other previously described messages. Still other possibilities exist and are within the scope of the present invention.

Those skilled in the art will appreciate that in each of the above embodiments, the phases leading up to a token being provided to communication device 104, 104\* can be omitted if communication device 104, 104\* already knows the token based on previous interaction with the MSI server 110.

Also, those skilled in the art will appreciate that that because the token can be made specific to the service provider 102, it is of little meaning or value to hackers and therefore the solutions described above present a lower security risk to consumers.

Also, those skilled in the art will appreciate that the manner in which services are accessed by the user of communication device 104, 104\* appears seamless (or virtually seamless) from the point of view of such user. In particular, the user need not take the affirmative step of entering subscription credentials or other identification data to the application server when requesting a service. Instead, any required authorization requests and the like are satisfied automatically with the assistance of the MSI server 110 and the business server 114.

Also, those skilled in the art will appreciate that in some cases, the application server 118 may be within the domain of the service provider 102. This would be the case with the service provider's own e-commerce or self-service portal, which could be accessible by the communication device over the internet 116. In addition, the application server 118 could have a secure internal connection to the business server 114/business backend 112. In this embodiment, the service provider 102 can offer true seamless self-service or electronic commerce, without requiring the customer to enter passwords, credentials or account information. At the same time, the tokens exchanged are simply numbers that have little meaning to a party that may intercept them, and thus the customer's experience is kept secure.

Also, those skilled in the art will appreciate that in some embodiments, steps 209 through 211 can be omitted. Instead, the information about communication device 104, which is sought after in order to resolve the application server's 118 inquiry, can be securely downloaded to the application server 118 in advance, for multiple customers (i.e., for multiple communication devices). In this way, the application server 118 may be able to check a local (i.e., cached) database of previously obtained subscription information, authorization information and other pertinent data rather than query the business server 114 each time such information is needed. Of course, in such a scenario, it is possible that the application server 118 could be accessing outdated ("stale") information regarding individual communication devices and therefore a mechanism could be devised whereby subscription information and other data is updated frequently (or whenever it changes) between the business server 114 and the application server 118.

Also, those skilled in the art will appreciate that in some embodiments, the various servers described above may be implemented using one or more computing apparatuses that have access to a code memory (not shown) which stores computer-readable program code (instructions) for operation of the one or more computing apparatuses. The computer-readable program code could be stored on a medium which is fixed, tangible and readable directly by the one or more computing apparatuses, (e.g., removable diskette, CD-ROM, ROM, fixed disk, USB drive), or the computer-readable program code could be stored remotely but transmittable to the one or more computing apparatuses via a modem or other interface device (e.g., a communications adapter) connected to a network (including, without limitation, the Internet) over a transmission medium, which may be either a non-wireless medium (e.g., optical or analog communications lines) or a wireless medium (e.g., microwave, infrared or other transmission schemes) or a combination thereof. In other embodiments, the servers may be implemented using pre-programmed hardware or firmware elements (e.g., application specific integrated circuits (ASICs), electrically erasable programmable read-only memories (EEPROMs), flash memory, etc.), or other related components.

In the examples described above, the devices and elements are connected to each other as shown in the figures, for the sake of simplicity. In practical applications of the present invention, elements, components, etc. may be connected directly to each other. As well, elements, components, etc. may be connected indirectly to each other through other elements, components, etc., necessary for operation of the devices or apparatus. Thus, in actual configuration, the devices, elements and components are directly or indirectly coupled with or connected to each other.

Certain adaptations and modifications of the described embodiments can be made. Therefore, the above discussed embodiments are to be considered illustrative and not restrictive. Also it should be appreciated that additional elements that may be needed for operation of certain embodiments of the present invention have not been described or illustrated as they are assumed to be within the purview of the person of ordinary skill in the art. Moreover, certain embodiments of the present invention may be free of, may lack and/or may function without any element that is not specifically disclosed herein. It is understood that the scope of the invention is limited only by the claims appended hereto.

What is claimed is:

1. A method for execution by an application server capable of being accessed by a communication device that is registered with a service provider having a certain domain, the method comprising:

receiving a request to execute an application, the request being received from the communication device over a communication channel that is at least partly within the domain of the service provider and at least partly not within the domain of the service provider;

redirecting the communication device to a first server to obtain a token from the first server, the first server being within the domain of the service provider;

receiving the token from the communication device over the communication channel;

providing the token to a second server within the domain of the service provider; and executing the application based on information about the communication device released by the second server in response to the token.

2. The method defined in claim 1, wherein the communication channel at least partly traverses the internet.

3. The method defined in claim 1, wherein the service provider is a home service provider and wherein the communication channel traverses network equipment within a domain of a visited service provider that has a commercial relationship with the home service provider.

4. The method defined in claim 3, wherein the commercial relationship comprises a roaming agreement.

5. The method defined in claim 4, wherein the communication channel traverses a WiFi network within the domain of the visited service provider.

6. The method defined in claim 1, wherein the second server is accessed over a second communication channel.

7. The method defined in claim 6, wherein the second communication channel at least partly traverses the internet.

8. The method defined in claim 1, wherein the information about the communication device comprises an indication of whether execution of the application is authorized.

9. The method defined in claim 8, wherein said executing the application is carried out only if the information about the communication device indicates that execution of the application is authorized.

10. The method defined in claim 1, wherein the information about the communication device comprises a location of the communication device.

11. The method defined in claim 10, wherein executing the application comprises executing a location-based application based on the location of the communication device.

12. The method defined in claim 1, wherein the application server is within the domain of the service provider.

13. The method defined in claim 12, wherein the application is a self-service or electronic commerce application controlled by the service provider.

14. The method defined in claim 13, wherein said receiving the request and said redirecting the communication device precede said receiving the token.

15. The method defined in claim 1, wherein the communication device is registered to a customer and wherein the token comprises either a service provider-specific subscriber identifier or a random number identifier.

16. The method defined in claim 1, wherein the token is anonymous.

17. The method defined in claim 1, further comprising:
issuing to the service provider a charge for a fee for having executed the application.

18. The method defined in claim 1, further comprising:
receiving from the service provider a charge for a fee for having been given the information about the communication device.

19. An application server capable of being accessed by a communication device that is registered with a service provider having a certain domain, the application server comprising:

an input for receiving a request to execute an application, the request being received from the communication device over a communication channel that is at least partly within the domain of the service provider and at least partly not within the domain of the service provider;

an output for redirecting the communication device to a first server to obtain a token from the first server, the first server being within the domain of the service provider;

the input also for receiving the token from the communication device over the communication channel;

the output also for providing the token to a second server within the domain of the service provider; and a processing entity for executing the application based on information about the communication device released by the second server in response to the token.

20. A non-transitory computer-readable storage medium storing computer-readable instructions which, when executed by an application server capable of being accessed by a communication device that is registered with a service provider having a certain domain, cause the application server to execute a method that comprises:

receiving a request to execute an application, the request being received from the communication device over a communication channel that is at least partly within the domain of the service provider and at least partly not within the domain of the service provider;

redirecting the communication device to a first server to obtain a token from the first server, the first server being within the domain of the service provider;

receiving the token from the communication device over the communication channel;

providing the token to a second server within the domain of the service provider; and executing the application based on information about the communication device released by the second server in response to the token.

* * * * *